(12) United States Patent
Lewis

(10) Patent No.: US 11,352,902 B2
(45) Date of Patent: Jun. 7, 2022

(54) COOLING ARRANGEMENT INCLUDING ALTERNATING PEDESTALS FOR GAS TURBINE ENGINE COMPONENTS

(71) Applicant: Raytheon Technologies Corporation, Farmington, CT (US)

(72) Inventor: Scott D. Lewis, Vernon, CT (US)

(73) Assignee: AYTHEON TECHNOLOGIES CORPORATION, Farmington, CT (US)

( * ) Notice: Subject to any disclaimer, the term of this patent is extended or adjusted under 35 U.S.C. 154(b) by 93 days.

(21) Appl. No.: 17/004,714

(22) Filed: Aug. 27, 2020

(65) Prior Publication Data

US 2022/0065129 A1 Mar. 3, 2022

(51) Int. Cl.
*F01D 25/12* (2006.01)
*F01D 11/00* (2006.01)

(52) U.S. Cl.
CPC ............ *F01D 25/12* (2013.01); *F01D 11/006* (2013.01); *F05D 2220/32* (2013.01); *F05D 2230/90* (2013.01); *F05D 2240/55* (2013.01); *F05D 2260/221* (2013.01); *F05D 2300/611* (2013.01)

(58) Field of Classification Search
CPC .... F01D 25/12; F01D 11/006; F05D 2220/32; F05D 2230/90; F05D 2240/55; F05D 2260/221; F05D 2300/611
See application file for complete search history.

(56) References Cited

U.S. PATENT DOCUMENTS

| | | | |
|---|---|---|---|
| 4,019,831 A * | 4/1977 | Franklin | F01D 5/189 416/97 R |
| 4,515,523 A | 5/1985 | North et al. | |
| 5,368,441 A * | 11/1994 | Sylvestro | F01D 5/187 416/97 R |
| 5,857,837 A * | 1/1999 | Zelesky | F01D 5/187 416/97 R |
| 6,234,754 B1 * | 5/2001 | Zelesky | B22C 9/10 416/97 R |
| 6,402,470 B1 * | 6/2002 | Kvasnak | F01D 5/187 415/115 |

(Continued)

FOREIGN PATENT DOCUMENTS

| | | |
|---|---|---|
| EP | 2586981 | 5/2013 |
| EP | 3540089 | 9/2019 |
| EP | 3663523 | 6/2020 |

OTHER PUBLICATIONS

Partial European Search Report for European Patent Application No. 21176168.9 dated Feb. 7, 2022.

*Primary Examiner* — J. Todd Newton
*Assistant Examiner* — Theodore C Ribadeneyra
(74) *Attorney, Agent, or Firm* — Carlson, Gaskey & Olds, P.C.

(57) ABSTRACT

A gas turbine engine component according to an example of the present disclosure includes, among other things, an external wall including adjacent bounding pedestals that extend from an external wall surface to establish a cooling passage, and including a common pedestal situated between the adjacent bounding pedestals to establish a first branched section and a second branched section of the cooling passage that join together at a merged section of the cooling passage. A method of fabricating a gas turbine engine component is also disclosed.

20 Claims, 12 Drawing Sheets

(56) References Cited

U.S. PATENT DOCUMENTS

| | | | |
|---|---|---|---|
| 6,599,092 B1 * | 7/2003 | Manning | F01D 5/187 416/97 R |
| 6,602,047 B1 * | 8/2003 | Barreto | F01D 5/187 415/1 |
| 6,896,487 B2 * | 5/2005 | Cunha | F01D 5/187 416/97 R |
| 6,929,451 B2 * | 8/2005 | Gregg | F01D 5/16 416/96 R |
| 6,969,230 B2 * | 11/2005 | Shi | F01D 5/187 415/115 |
| 7,125,225 B2 * | 10/2006 | Surace | F01D 5/187 416/96 R |
| 7,156,620 B2 * | 1/2007 | Papple | F01D 5/187 415/115 |
| 7,255,534 B2 * | 8/2007 | Liang | F01D 5/14 415/115 |
| 7,575,414 B2 * | 8/2009 | Lee | F01D 5/187 415/115 |
| 7,686,580 B2 * | 3/2010 | Cunha | F01D 5/186 416/97 R |
| 7,731,481 B2 * | 6/2010 | Cunha | B22C 9/103 416/97 R |
| 8,882,461 B2 | 11/2014 | Morris et al. | |
| 9,366,144 B2 | 6/2016 | Zess et al. | |
| 10,100,645 B2 | 10/2018 | Lewis et al. | |
| 10,337,332 B2 | 7/2019 | Auxier et al. | |
| 10,830,072 B2 * | 11/2020 | Albert | F01D 9/041 |
| 11,168,570 B1 * | 11/2021 | Lewis | F01D 5/186 |
| 2007/0041835 A1 * | 2/2007 | Charbonneau | F01D 5/187 416/97 R |
| 2009/0246011 A1 | 10/2009 | Itzel | |
| 2011/0085915 A1 * | 4/2011 | Krueckels | F01D 5/187 416/97 R |
| 2013/0209269 A1 | 8/2013 | Gleiner et al. | |
| 2014/0044555 A1 | 2/2014 | Lewis et al. | |
| 2016/0245097 A1 | 8/2016 | Jones et al. | |
| 2017/0260864 A1 * | 9/2017 | Leon | B22C 9/10 |
| 2018/0216473 A1 * | 8/2018 | Hill | F01D 5/187 |
| 2019/0048729 A1 * | 2/2019 | Clum | F01D 5/187 |

* cited by examiner

COOLING ARRANGEMENT INCLUDING ALTERNATING PEDESTALS FOR GAS TURBINE ENGINE COMPONENTS

BACKGROUND

This disclosure relates to cooling for a component, such as a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

Some cooling schemes may employ cooling holes that communicate cooling flow to adjacent portions of the blades or vanes. Surfaces of the blades or vanes may include a coating.

SUMMARY

A gas turbine engine component according to an example of the present disclosure includes an external wall including adjacent bounding pedestals that extend from an external wall surface to establish a cooling passage, and including a common pedestal situated between the adjacent bounding pedestals to establish a first branched section and a second branched section of the cooling passage that join together at a merged section of the cooling passage. First and second inlets are established between the common pedestal and respective ones of the adjacent bounding pedestals. The first and second inlets are coupled to an internal cavity. The merged section interconnects the first and second branched sections and an outlet. The outlet is established along the external wall surface between the adjacent bounding pedestals which extend to the outlet. The common pedestal are spaced apart from the outlet. The adjacent bounding pedestals and the common pedestal are dimensioned such that first and second throats are established along the respective first and second branched sections and such that the first and second branched sections expand towards the outlet to establish respective diffusion zones. The diffusion zones interconnect the merged section and the respective first and second throats. One or more coatings extend into the outlet to establish a coated outlet region of the cooling passage. The first and second throats establish a local minimum cross-sectional area along the respective first and second branched sections. A local minimum cross-sectional area of the cooling passage along the coated outlet region is divided by a total of the minimum cross-sectional areas of the first and second throats establishes a coated area ratio. The coated area ratio is greater than or equal to 0.8, and is less than or equal to 1.5.

In a further embodiment of any of the foregoing embodiments, each of the adjacent bounding pedestals and the common pedestal comprises a ceramic or metallic material, and the one or more coatings comprise a ceramic and/or metallic material.

In a further embodiment of any of the foregoing embodiments, the gas turbine engine component is an airfoil including an airfoil section extending in a radial direction from a platform section, extending in a chordwise direction between a leading edge and a trailing edge, and extending in a thickness direction between a pressure side and a suction side that join together at the leading and trailing edges.

In a further embodiment of any of the foregoing embodiments, the outlet is established along the trailing edge. Each of the adjacent bounding pedestals and the common pedestal comprises a metallic or ceramic material, and the one or more coatings includes a thermal barrier coating comprising a ceramic material and/or metallic material. The coated area ratio is less than or equal to 1.5. The first and second branched sections exclude any pedestals between the common pedestal and the respective adjacent bounding pedestals.

In a further embodiment of any of the foregoing embodiments, a distance between the uncoated adjacent bounding pedestals progressively increases along the diffusion zones in a first direction towards the outlet.

In a further embodiment of any of the foregoing embodiments, a distance between the uncoated adjacent bounding pedestals progressively decreases along the diffusion zones in a first direction towards the outlet.

In a further embodiment of any of the foregoing embodiments, the adjacent bounding pedestals include first and second pedestals extending along respective longitudinal axes that are substantially parallel to each other. The first pedestal is associated with the first branched section. The second pedestal is associated with the second branched section. Facing walls of the common pedestal and the first pedestal are substantially parallel along a first length of the cooling passage between the first throat and the respective diffusion zone to establish a first metering zone. Facing walls of the common pedestal and the second pedestal are substantially parallel along the first length of the cooling passage between the second throat and the respective diffusion zone to establish a second metering zone. Facing walls of the adjacent bounding pedestals are substantially parallel along a second length of the merged section to establish a flat zone.

In a further embodiment of any of the foregoing embodiments, the longitudinal axes of the adjacent bounding pedestals establish a pitch, a first width is established as a widest distance across the first throat, a second width is established as a widest distance across the second throat, and wherein a ratio of a total of the first and second widths divided by the pitch is greater than or equal to 0.25 and is less than or equal to 0.65.

In a further embodiment of any of the foregoing embodiments, the cooling passage excludes any pedestals across the first and second throats.

In a further embodiment of any of the foregoing embodiments, opposed faces of the external wall span between the facing walls of the adjacent bounding pedestals to bound the cooling passage. The opposed faces establish a first height at the outlet. A ratio of an average thickness of the one or more coatings along the opposed faces at the outlet divided by the first height is greater than or equal to 0.08.

In a further embodiment of any of the foregoing embodiments, the adjacent bounding pedestals extend along respective longitudinal axes and along respective reference planes that bisects the adjacent bounding pedestals along the respective longitudinal axes. The longitudinal axes are substantially parallel to each other. A first cross-sectional area is established along the external wall surface at the outlet. The first cross-sectional area is defined between the reference planes and between the opposed faces, and one minus a ratio of a cross-sectional area of the outlet bounded by the coated outlet region divided by the first cross-sectional area defines a blockage ratio. The blockage ratio is greater than or equal to 0.35.

In a further embodiment of any of the foregoing embodiments, the facing walls of the adjacent bounding pedestals bounding the cooling passage are filleted from the respective first and second inlets to the outlet.

A gas turbine engine according to an example of the present disclosure includes an array of blades and an array of vanes spaced axially from the array of blades in a gas path. The array of blades are rotatable in the gas path, and an array of blade outer air seals (BOAS) are arranged about the array of blades to bound the gas path. At least one of the array of blades, the array of vanes and the array of BOAS includes an external wall between an internal wall surface and an external wall surface. The internal wall surface bounds an internal cavity. At least one pair of adjacent bounding pedestals are established in a thickness of the external wall. The adjacent bounding pedestals extend from the external wall surface to establish a cooling passage. A common pedestal is situated between the adjacent bounding pedestals to establish a first branched section and a second branched section that join together at a merged section. The merged section establishes an outlet along the external wall surface between the adjacent bounding pedestals which extend to the outlet. The common pedestal is spaced apart from the outlet, and the adjacent bounding pedestals and the common pedestal establish first and second throats along the respective first and second branched sections and establish respective diffusion zones between the respective first and second throats and the merged section. One or more coatings extend into the outlet to establish a coated outlet region of the merged section of the cooling passage. The first and second throats establish a local minimum cross-sectional area along the respective first and second branched sections. A local minimum cross-sectional area of the cooling passage along the coated outlet region is divided by a total of the local minimum cross-sectional areas of the first and second throats establishes a coated area ratio. The coated area ratio is greater than or equal to 0.8, and is less than or equal to 1.5.

In a further embodiment of any of the foregoing embodiments, an airfoil section comprises the external wall. The airfoil section extends in a thickness direction between pressure and suction sides and extends in a chordwise direction between leading and trailing edges, and the outlet is established adjacent the trailing edge. The external wall comprises a ceramic or metallic material. The one or more coatings includes a thermal barrier coating comprising a ceramic material and/or a metallic material.

In a further embodiment of any of the foregoing embodiments, first and second inlets to the respective first and second branched sections are established between the adjacent bounding pedestals and the common pedestal. The first and second inlets are coupled to the internal cavity. The first and second branched sections taper from the respective first and second inlets in a first direction towards the outlet to establish the first and second throats. A distance between the adjacent bounding pedestals progressively increases along the diffusion zones in the first direction towards the outlet.

In a further embodiment of any of the foregoing embodiments, first and second inlets to the respective first and second branched sections are established between the adjacent bounding pedestals and the common pedestal, and the first and second inlets are coupled to the internal cavity. The first and second branched sections taper from the respective first and second inlets in a first direction towards the outlet to establish the first and second throats. A distance between the adjacent bounding pedestals progressively decreases along the diffusion zones in the first direction towards the outlet.

A method of fabricating a gas turbine engine according to an example of the present disclosure includes component establishing an internal cavity bounded by an external wall, and establishing a cooling passage between adjacent bounding pedestals in the external wall. The adjacent bounding pedestals extend from an external wall surface of the external wall to establish an outlet of the cooling passage. A common pedestal is situated between the adjacent bounding pedestals to establish a first branched section and a second branched section of the cooling passage that join together at a merged section of the cooling passage. The merged section interconnects the first and second branched sections and the outlet. The common pedestal is spaced apart from the outlet. First and second inlets to the respective first and second branched sections are established between the adjacent bounding pedestals and the common pedestal. The first and second inlets are coupled to the internal cavity. The adjacent bounding pedestals and the common pedestal are dimensioned such that first and second throats are established along the respective first and second branched sections and such that the first and second branched sections expand towards the outlet to establish respective diffusion zones. The diffusion zones interconnect the merged section and the respective first and second throats forming one or more coatings along the external wall surface and into the outlet to establish a coated outlet region of the cooling passage. The first and second throats establish a local minimum cross-sectional area along the respective first and second branched sections. A local minimum cross-sectional area of the cooling passage along the coated outlet region is divided by a total of the local minimum cross-sectional areas of the first and second throats establishes a coated area ratio. The coated area ratio is greater than or equal to 0.8, and is less than or equal to 1.5.

In a further embodiment of any of the foregoing embodiments, the gas turbine engine component is an airfoil including an airfoil section extending in a radial direction from a platform section, extending in a chordwise direction between a leading edge and a trailing edge, and extending in a thickness direction between a pressure side and a suction side that join together at the leading and trailing edges. The outlet is established along the trailing edge. Each of the adjacent bounding pedestals and the common pedestal comprises a metal or ceramic material, and the one or more coatings comprise a ceramic and/or metallic material.

In a further embodiment of any of the foregoing embodiments, the first and second branched sections taper from the respective first and second inlets in a first direction towards the outlet to establish the first and second throat. A distance between the adjacent bounding pedestals progressively increases along the diffusion zones in the first direction towards the outlet.

In a further embodiment of any of the foregoing embodiments, the first and second branched sections taper from the respective first and second inlets in a first direction towards the outlet to establish the first and second throat. A distance between the adjacent bounding pedestals progressively decreases along the diffusion zones in the first direction towards the outlet.

The various features and advantages of this invention will become apparent to those skilled in the art from the following detailed description of an embodiment. The drawings that accompany the detailed description can be briefly described as follows.

DETAILED DESCRIPTION

Figure 1:
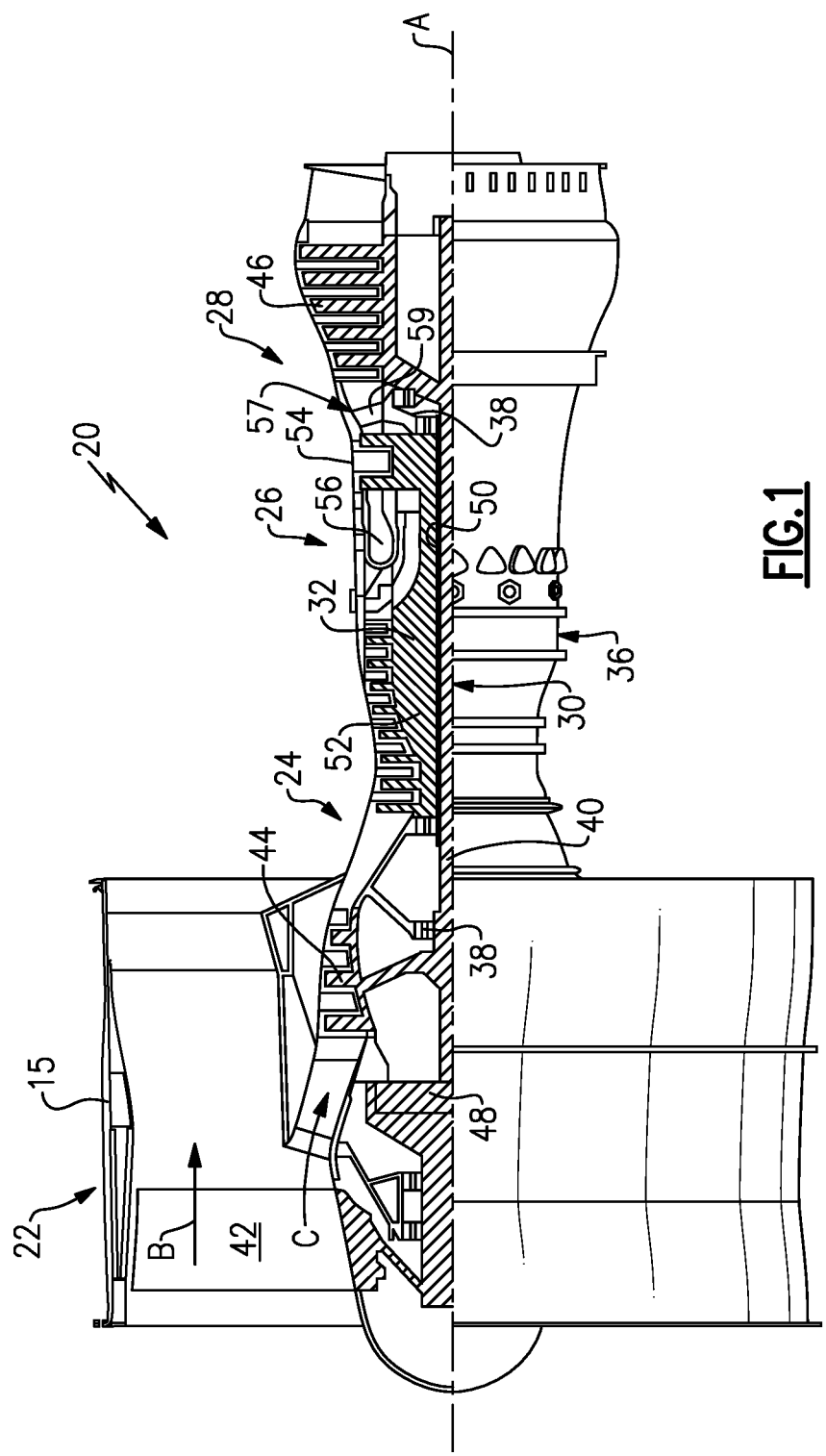
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
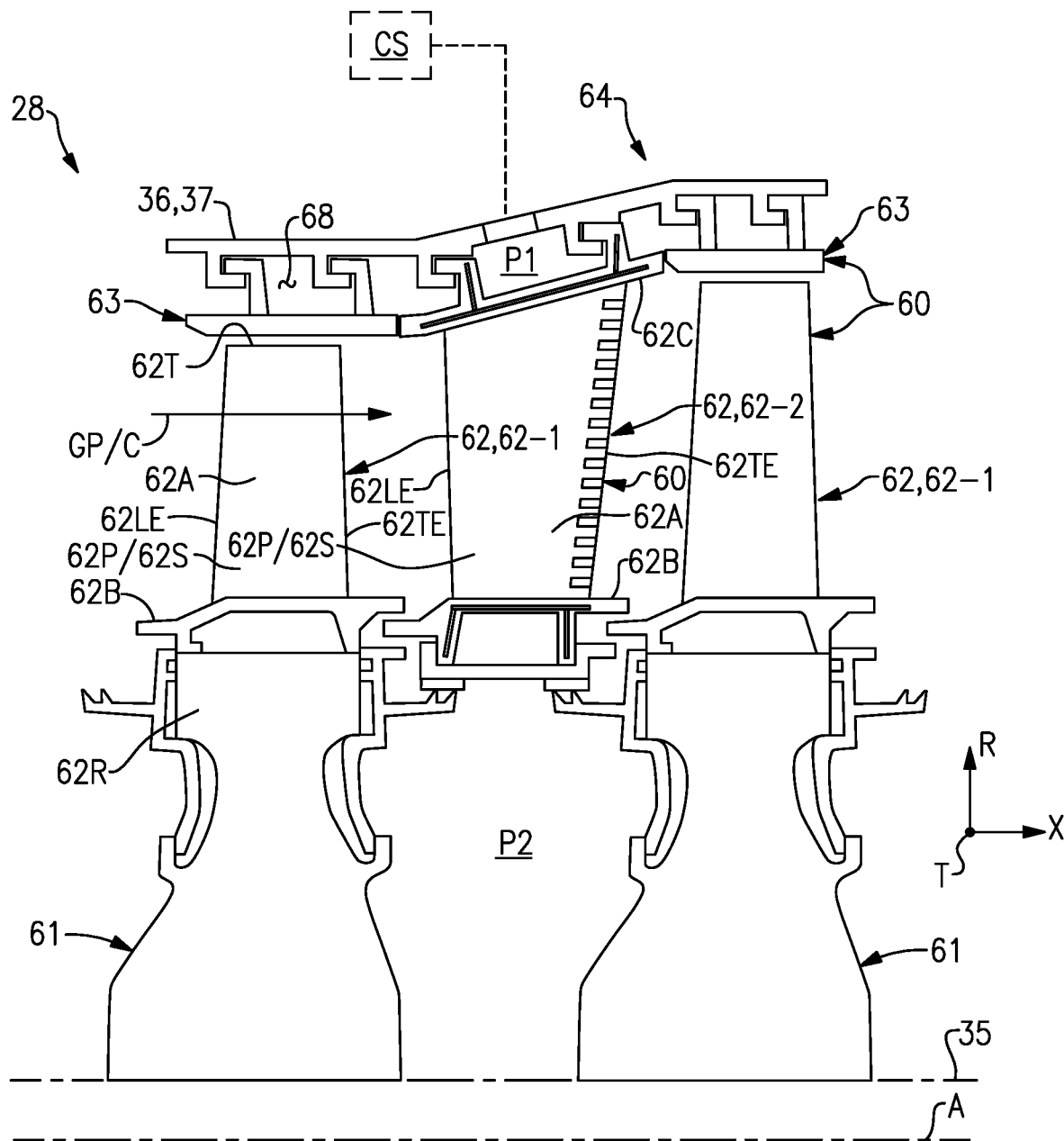
FIG. 2 schematically shows an airfoil arrangement.

FIG. 2 illustrates an exemplary section of a gas turbine engine, such as the turbine section 28 of FIG. 1. Although the disclosure primarily refers to the turbine section 28, it should be understood that other portions of the engine 20 can benefit from the teachings disclosed herein, including airfoils in the compressor section 24 and combustor panels or liners in the combustor section 26, and other portions of the engine 20 that may be subject to elevated temperature conditions during engine operation. Other systems can benefit from the teachings disclosed herein, including gas turbine engines and other systems lacking a fan for propulsion. In this disclosure, like reference numerals designate like elements where appropriate and reference numerals with the addition of one-hundred or multiples thereof designate modified elements that are understood to incorporate the same features and benefits of the corresponding original elements.

The turbine section 28 includes a plurality of components 60 arranged relative to the engine axis A, including a rotor 61, one or more airfoils 62, and one or more blade outer air seals (BOAS) 63. Example airfoils 62 include blades 62-1 and vanes 62-2. The rotor 61 is coupled to a rotatable shaft 35 (shown in dashed lines for illustrative purposes). The shaft 35 can be one of the shafts 40, 50 of FIG. 1, for example. The rotor 61 carries one or more blades 62-1 that are rotatable about the engine axis A in a gas path GP, such as the core flow path C.

Each airfoil 62 includes an airfoil section 62A extending in a spanwise or radial direction R from a first platform 62B. In the illustrative example of FIG. 2, each blade 62-1 extends in the radial direction R from the platform 62B to a tip 62T, and each vane 62-2 extends in the radial direction R from the first (e.g., inner) platform 62B to a second (e.g., outer) platform 62C. The platforms 62B, 62C bound or define a portion of the gas path GP. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE. The root section 62R of the blade 62-1 is mounted to, or integrally formed with, the rotor 61. The vane 62-2 can be arranged to direct or guide flow in the gas path GP from and/or towards the adjacent blade(s) 62-1.

Each BOAS 63 can be spaced radially outward from the tip 62T of the blade 62-1. The BOAS 63 can include an array of seal arc segments that are circumferentially distributed or arranged in an annulus about an array of the airfoils 62 to bound the gas path GP.

The turbine section 28 includes at least one array of airfoils 62, including at least one array of blades 62-1 and at least one array of vanes 62-2, and at least one array of BOAS 63 arranged circumferentially about the engine axis A. The array of vanes 62-2 are spaced axially from the array of blades 62-1 relative to the engine axis A. The tips 62T of the blades 62-1 and adjacent BOAS 63 are arranged in close radial proximity to reduce the amount of gas flow that escapes around the tips 62T through a corresponding clearance gap.

The turbine section 28 includes a cooling arrangement 64 for providing cooling augmentation to the components 60 during engine operation. The cooling arrangement 64 includes one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more cooling sources CS (one shown) are configured to provide cooling air to the plenums P1, P2. The plenums P1, P2 are configured to receive pressurized cooling flow from the cooling source(s) CS to cool portions of the airfoils 62 and/or BOAS 63. Cooling sources CS can include bleed air from an upstream stage of the compressor section 24 (FIG. 1), bypass air, or a secondary cooling system aboard the aircraft, for example. Each of the plenums P1, P2 can extend in a circumferential or thickness direction T between adjacent airfoils 62 and/or BOAS 63.

FIGS. 3-9 illustrate an exemplary gas turbine engine component 160 including a cooling arrangement 164. The component 160 can be a combustion liner incorporated into the combustor section 26, or a BOAS 63 or airfoil 62 such as a blade 62-1 or vane 62-2 incorporated into the turbine section 28 of FIGS. 1 and 2, for example. In the illustrative example of FIG. 3, the component 160 is an airfoil 162 shown as a blade 162-1. The blade 162-1 can be a turbine blade incorporated into one or more rows of the turbine section 28, for example.

Figure 3:
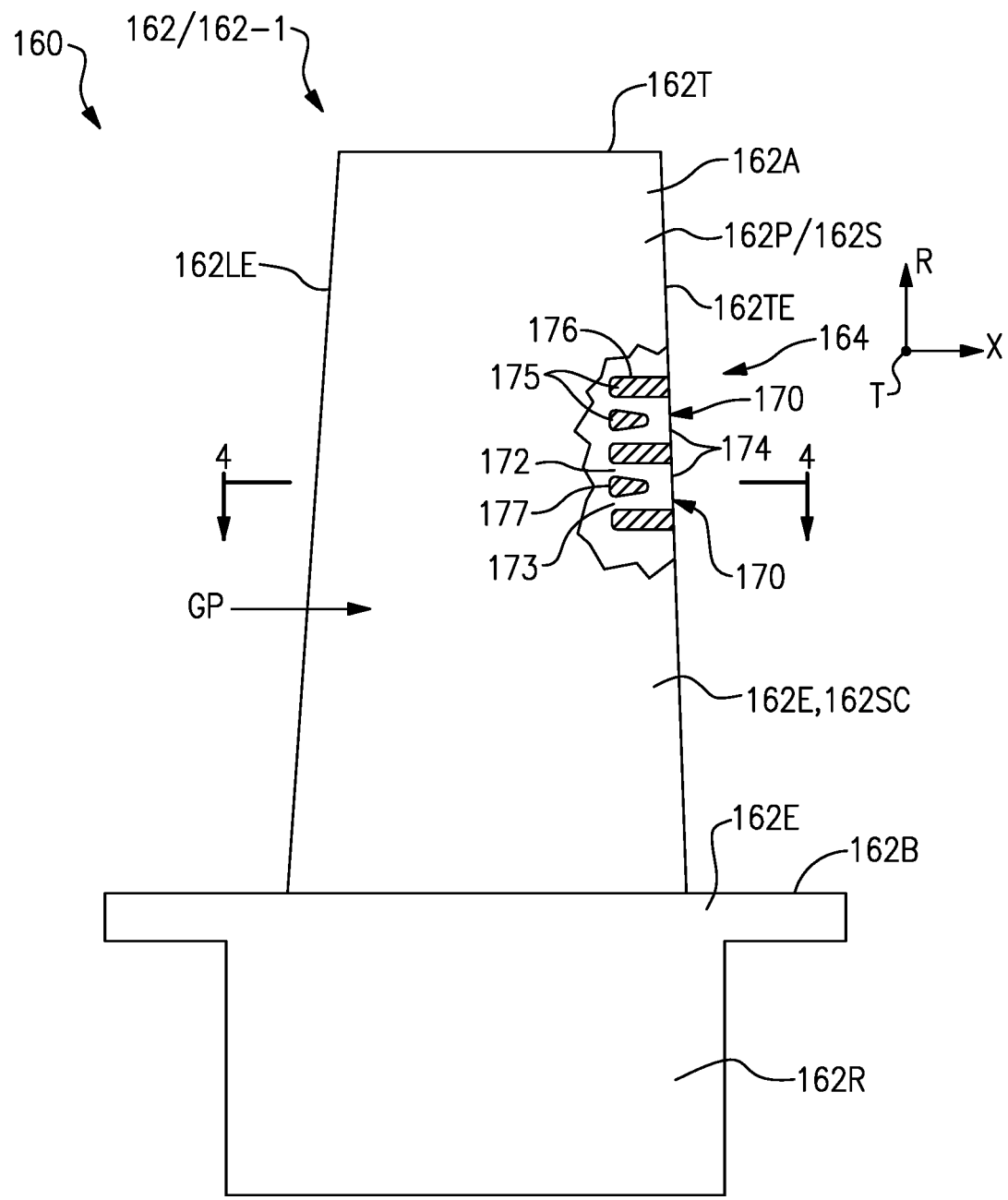
FIG. 3 illustrates a perspective view of an exemplary component including a cooling arrangement.
Figure 4:
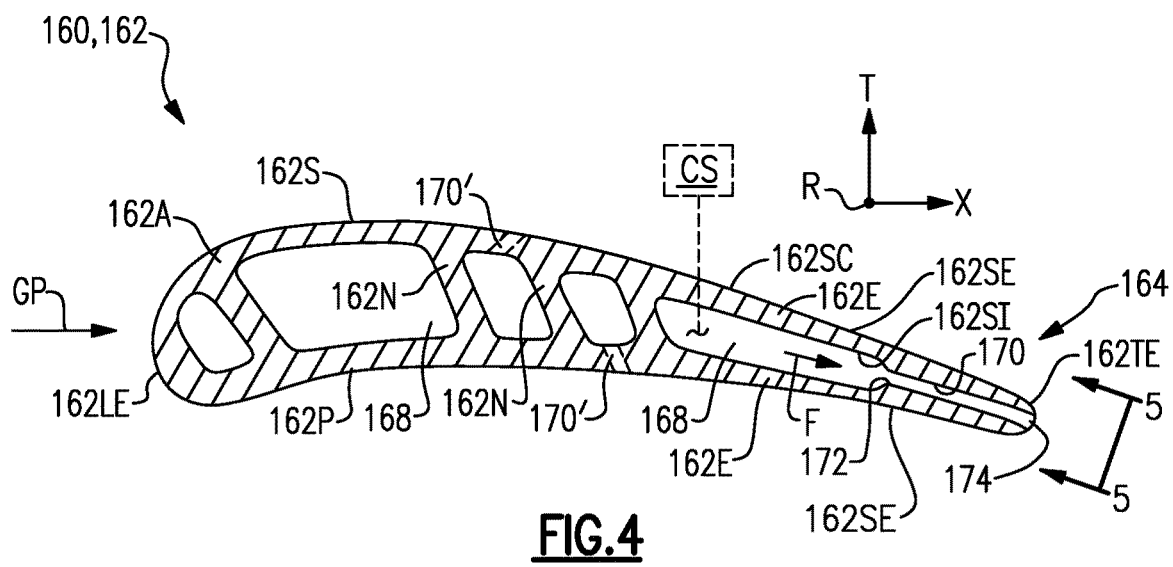
FIG. 4 illustrates a sectional view taken along line 4-4 of FIG. 3.

Referring to FIGS. 3-4, the airfoil 162 includes an airfoil section 162A extending in a radial direction R from a platform section 162B (FIG. 3). The airfoil section 162A extends in a chordwise direction X between a leading edge 162LE and a trailing edge 162TE. The airfoil section 162A extends in a thickness direction T between a pressure side 162P and a suction side 162S joined together at the leading and trailing edges 162LE, 162TE. The airfoil 162 can include one or more external walls 162E and one or more internal walls 162N (FIG. 4) defined within a thickness of the airfoil section 162A and/or platform section 162B. Surfaces along the external walls 162E of the airfoil section 162A and the platform(s) 162B establish an external surface contour 162SC that interacts with gases in a gas path GP during operation, such as the core flow path C of FIGS. 1-2.

The component 160 can be made of various materials including metallic, composite and/or non-metallic materials. Example metallic materials include high temperature metals or alloys, such as a nickel-based super alloy. Single crystal and directionally solidified metallic materials can be utilized. The component 160 can be made of a ceramic or ceramic matrix composite (CMC) material formed from one or more layers of a CMC layup.

Referring to FIG. 4, with continuing reference to FIG. 3, the external wall 162E extends between an external wall surface 162SE and another opposed external wall surface 162SE and/or internal wall surface 162SI. In the illustrated example of FIG. 4, the airfoil section 162A includes external walls 162E that establish the external surface contour 162SC.

The component 160 defines one or more plenums or internal cavities 168 in a thickness of the airfoil section 162A or another portion of the component 160. Each of the cavities 168 can be fluidly coupled to a coolant source CS (shown in dashed lines for illustrated purposes). The internal cavities 168 can serve as impingement cavities and/or upstream feeding cavities for receiving cooling flow F from the coolant source CS. Each internal wall surface 162SI can bound one of the internal cavities 168.

The component 160 defines one or more cooling channels or passages 170 for cooling portions of the component 160. At least some of the cooling passages 170 are defined in the external wall(s) 162E. Each of the cooling passages 170 extends between a respective inlet 172 and outlet 174. The cooling passage 170 can convey cooling flow F to provide cooling augmentation to adjacent portions of the component 160.

Figure 5:
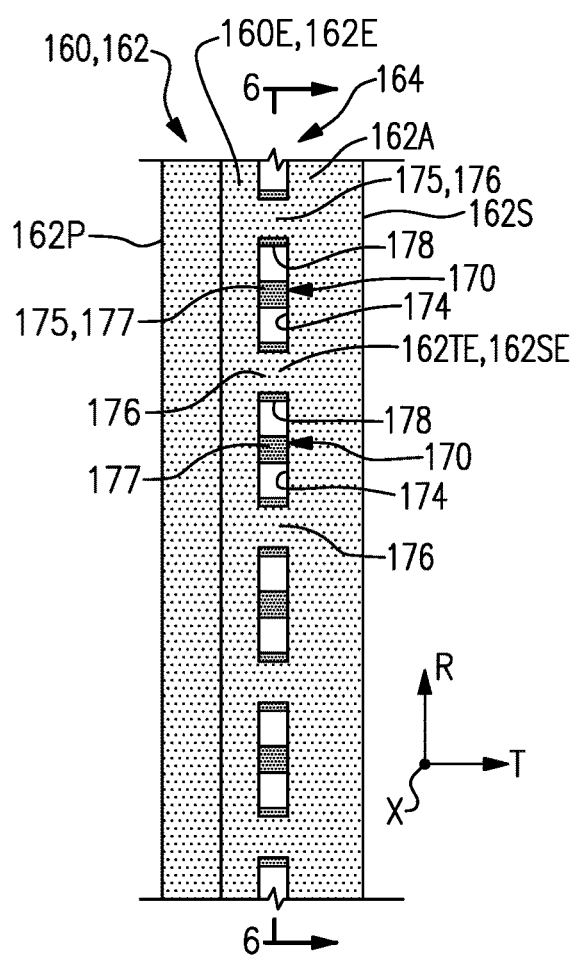
FIG. 5 illustrates a view taken from line 5-5 of FIG. 4.

In the illustrative example of FIGS. 4 and 5, one or more (or each) of the outlets 174 are established along or otherwise adjacent to the trailing edge 162TE. In examples, the outlet 174 is established at a position along the external wall surface 162SE at a distance of less than about 5.0 percent of a chord length from the trailing edge 162TE. For the purposes of this disclosure, the chord length is defined as a minimum distance between the leading and trailing edges 162LE, 162TE at the same radial position as the respective outlet 174. For purposes of this disclosure, the terms "about," "approximately" and "substantially" mean±3% of the stated value or relationship unless otherwise indicated. It should be understood that one or more of the outlets 174 can be established along other portions of the airfoil section 162A, the platform 162B, and other portions of the component 160 that may benefit from cooling augmentation. Other exemplary locations of passages 170' are shown in dashed lines for illustrative purposes.

Figure 6:
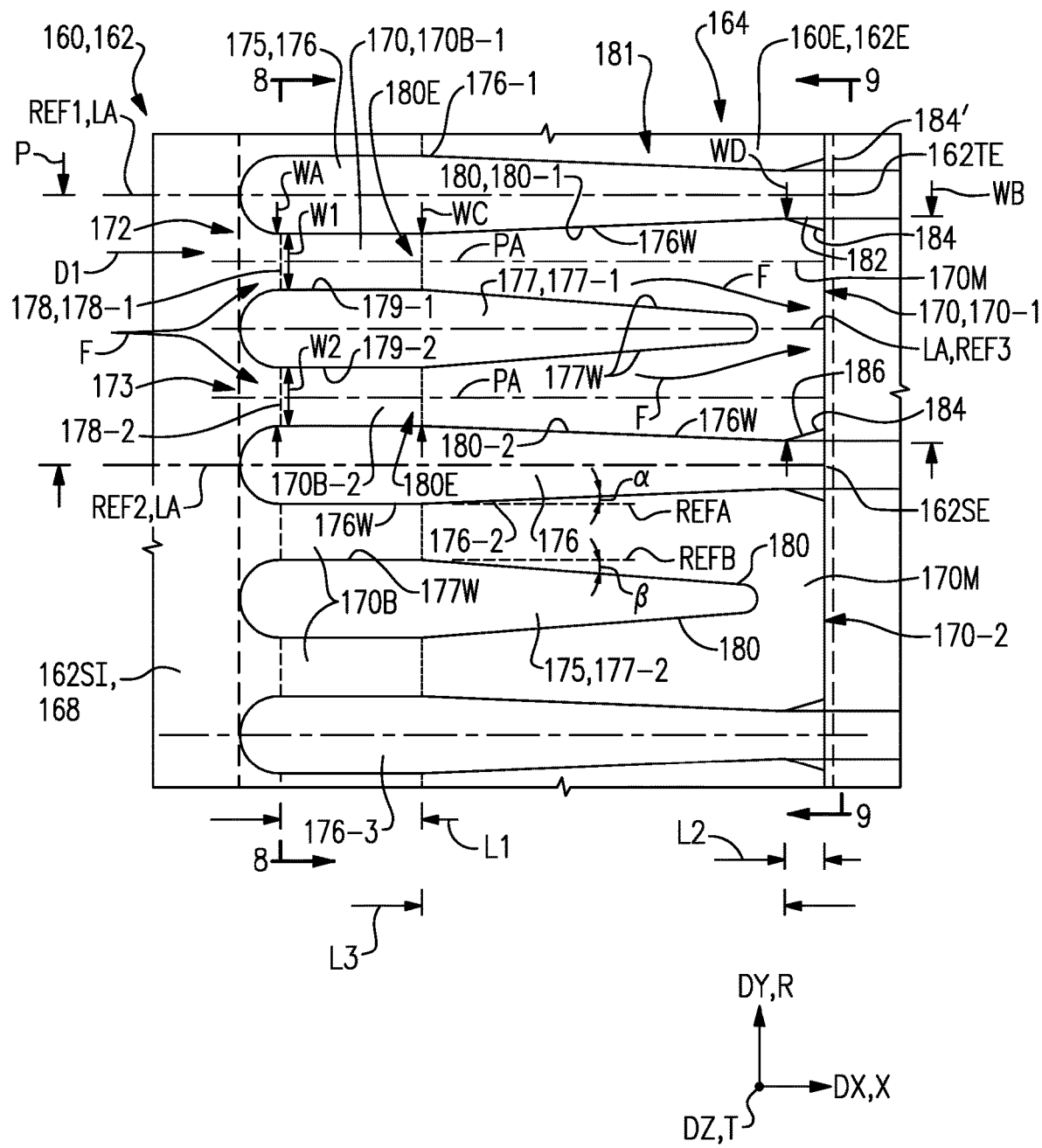
FIG. 6 illustrates a sectional view of the cooling arrangement of FIG. 5.

Referring to FIGS. 5-6, with continued reference to FIGS. 3-4, the component 160 can include one or more transfer (or augmentation) features 175 in a wall 160E of the component 160, such as the external wall(s) 162E. The transfer features 175 include bounding pedestals 176 and common (or metering) pedestals 177 dimensioned to span between opposed walls of the component 160. Other exemplary transfer features can include turbulators such as trip strips, bulges and dimples. The pedestals 176, 177 can be arranged in a row with respect to the radial direction R, as illustrated by FIGS. 5-6, or in another orientation.

Referring to FIG. 6, with continuing reference to FIG. 5, the pedestals 176, 177 are established in a thickness of the external wall 162E. The component 160 includes at least one row of bounding pedestals 176 that establish a row of cooling passages 170. The row of pedestals 176 and cooling passages 170 are distributed in a direction DY and are at least partially axially aligned in a direction DX perpendicular to a height of the pedestals 176 in a direction DZ. The directions DX, DY, DZ can correspond to the chordwise, radial and thickness directions X, R, T, for example. The cooling arrangement 164 is established such that the bounding pedestals 176 alternate in sequence with the common pedestals 177, as illustrated in FIG. 6. The alternating pedestal arrangements disclosed herein may serve to convey sufficient diffusion flow in instances in which relatively thick coatings are disposed along and into the respective outlets.

The exemplary cooling arrangement 164 includes first, second and third bounding pedestals 176-1, 176-2 and 176-3 and first and second common pedestals 177-1, 177-2 arranged in a row. The bounding pedestals 176 are arranged in adjacent pairs to establish respective cooling passages 170 therebetween. In the illustrative examples of FIG. 6, two common pedestals 177-1, 177-2 are arranged between the adjacent pedestals 176 of the two pairs of adjacent bounding pedestals 176-1/176-2, 176-2/176-3 to establish two adjacent cooling passages 170-1, 170-2, with pedestal 176-2 being common to both pairs 176-1/176-2, 176-2/176-3. Fewer or more than two pairs of bounding pedestals 176 can be utilized to establish the cooling arrangement 164, such as only one pair of bounding pedestals 176.

The pedestals 176, 177 can have various geometries to establish a profile of the respective cooling passages 170. In the illustrative example of FIG. 6, each of the bounding pedestals 176 and common pedestals 177 has generally spear-shaped geometry. It should be understood that other pedestal geometries can be utilized to establish the cooling passages, including any of the geometries disclosed herein.

Each pedestal 176, 177 can be elongated and extends along a respective longitudinal axis LA that intersects opposed upstream and downstream ends of the respective pedestal 176, 177. The longitudinal axis LA can have a major component in the direction DX. The bounding pedestals 176 extend along the longitudinal axes LA from the external wall surface 162SE to an opposed internal wall surface 162SI to establish the respective cooling passage 170. Each pair of bounding pedestals 176 (e.g., 176-1, 176-2) are directly adjacent to each other with respect to a position along the outlet 174.

The common pedestals 177 are situated between respective pairs of the bounding pedestals 176 to divide a portion of the respective cooling passage 170. The common pedestal 177 is directly adjacent to each bounding pedestal 176 in the respective pair of pedestals 176, as illustrated by pedestals 176-1, 176-2 and pedestal 177-1.

Each cooling passage 170 includes a first inlet 172 and a second inlet 173. The first and second inlets 172, 173 are established between the upstream edges of the common pedestal 177 and bounding pedestals 176 that are directly adjacent to the common pedestal 177. Each inlet 172, 173 can be coupled to the internal cavity 168 along the internal wall surface 162SI to convey cooling flow F to the cooling passage 170.

Each outlet 174 can be established along the external wall surface 162SE of the component 160, such as along the trailing edge 162TE, as illustrated by FIGS. 4, 5, and 6. In the illustrative example of FIG. 6, one or more cooling passages 170 established by the adjacent pedestals 176 are fluidly isolated between the inlets 172, 173 and outlet 174 with respect to other directly adjacent cooling passage(s) 170, as illustrated by cooling passages 170-1, 170-2.

The common pedestals 177 are situated between respective pairs of the bounding pedestals 176 to divide a portion of the respective cooling passage 170 between at least two branched sections 170B. The common pedestal 177 is spaced apart from the outlet 174 such that no other pedestals are arranged between facing walls 176W of the adjacent pedestals 176 bounding the respective cooling passage 170 at the outlet 174, as illustrated by the pair of pedestals 176-1, 176-2 in FIG. 6.

For example, the common pedestal 177-1 is situated between the pair of the bounding pedestals 176-1, 176-2 to establish a first branched section 170B-1 and a second branched section 170B-2 of the cooling passage 170. The branched sections 170 include a first branched section 170B-1 and a second branched section 170B-2 on opposed sides of the common pedestal 177. The first pedestal 176-1 is associated with the first branched section 170B-1, and the second pedestal 176-2 is associated with the second branched section 170B-2. The branched sections 170B-1, 170B-2 join together or merge at a merged section 170M of the cooling passage 170 at the downstream end of the common pedestal 177-1. The merged section 170M establishes an outlet 174 along the external wall surface 162SE between the bounding pedestals 176-1, 176-2. The merged section 170M interconnects the first and second branched sections 170B-1, 170B-2 and the outlet 174, and extends in the direction DX between a terminal end of the common pedestal 177 and the outlet 174.

A respective meter or throat 178 is established along each of the branched sections 170B to meter flow F through the cooling passage 170 (shown in dashed lines for illustrative purposes). The bounding pedestals 176-1, 176-2 and the common pedestal 177-1 are dimensioned such that first and second throats 178-1, 178-2 are established along the respective branched sections 170B-1, 170B-2.

Figure 8:
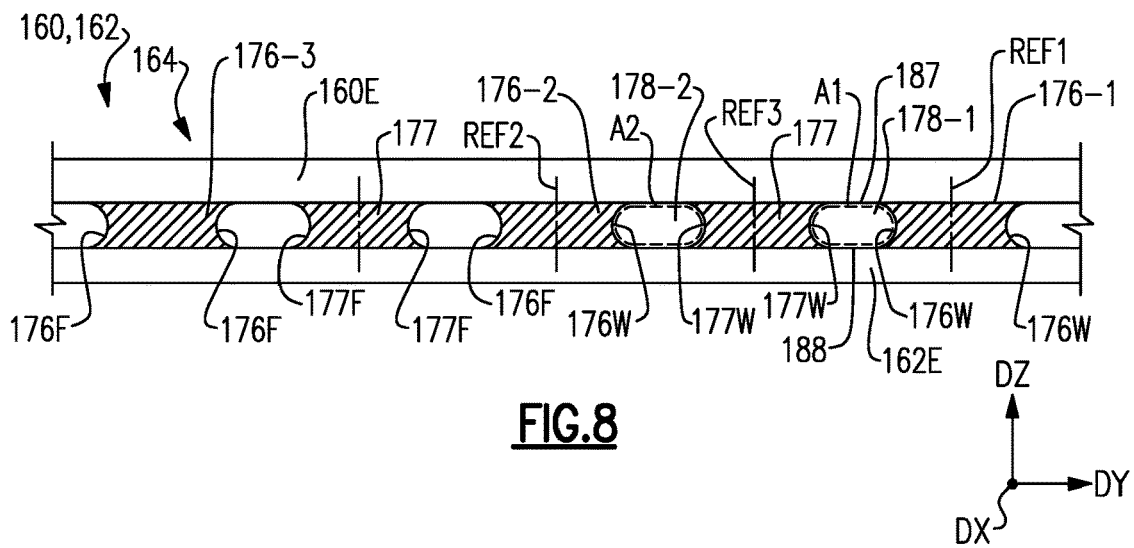
FIG. 8 illustrates a sectional view taken along line 8-8 of FIG. 6.
Figure 9:
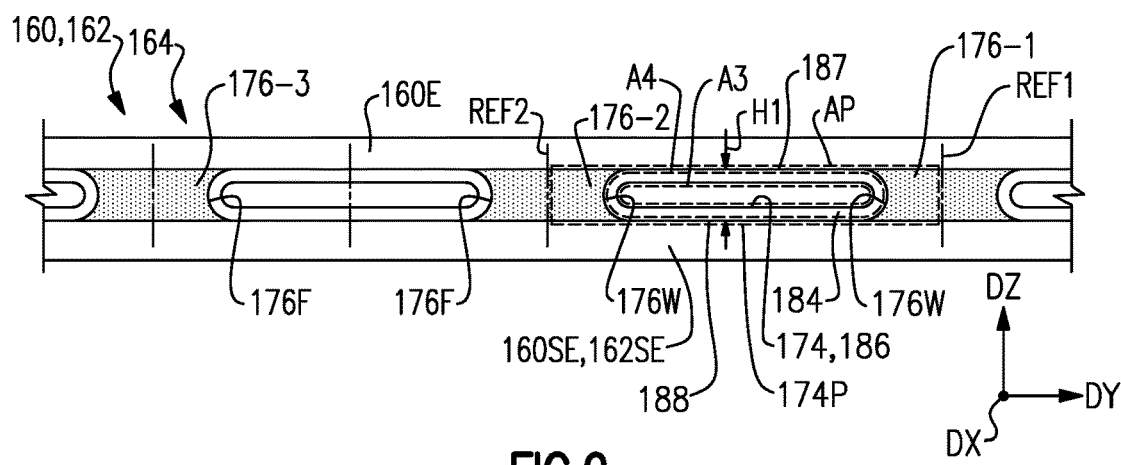
FIG. 9 illustrates a sectional view taken along line 9-9 of FIG. 6.

The throats 178-1, 178-2 establish a minimum cross-sectional area along the respective branched sections 170B-1, 170B-2 between the inlets 172, 173 and merged section 170M, and serve to meter flow through the cooling passage 170. The throats 178 and outlet 174 can have various geometries, such as a generally racetrack-shaped or elongated geometry as illustrated in FIGS. 8-9.

The pedestals 176, 177 can be dimensioned to establish a relatively compact arrangement. The longitudinal axis LA of the pair of adjacent pedestals 176 establish a respective pitch P (FIG. 6). The pitch P may be established with respect to the center of the adjacent pedestals 176 along the respective longitudinal axes LA. A first width W1 is established as a widest distance across the first throat 178-1, and a second width W2 is established as a widest distance across the second throat 178-2. The first and second widths W1, W2 are taken at a widest distance across the throats 178-1, 178-2 to account for any contouring of the walls 176W, 177W at the position of the throats 178-1, 178-2. The pedestals 176, 177 can be dimensioned such that a ratio of a total of the first and second widths W1, W2 divided by the pitch P is greater than or equal to about 0.25, or more narrowly above about 0.3 and less than or equal to about 0.65.

Facing walls 176W of the bounding pedestals 176 and facing walls 177W of the common pedestal 177 can be dimensioned such that the branched sections 170B-1, 170B-2 taper inwardly from the respective inlet 172, 173 in a first direction D1 towards the outlet 174 to establish the respective throats 178-1, 178-2. The bounding pedestals 176 and common pedestal 177 can be dimensioned such that the throats 178-1, 178-2 are established at substantially the same axial position relative to the direction DX and are spaced apart from the respective inlets 172, 173, as illustrated in FIG. 6. In other examples, the throats 178-1, 178-2 are established at the respective inlets 172, 173 and/or are established at different axial positions The cooling arrangement 164 can be established such that the branched sections 170B-1, 170B-2 exclude any pedestals between the common pedestal 177-1 and the respective adjacent branched pedestals 176-1, 176-2, including across the respective throats 178-1, 178-2, as illustrated in FIGS. 6-8.

Each of the branched sections 170B extends along a respective passage axis PA between a respective inlet 172, 173 and the merged section 170M. The passage axes PA of the branched sections 170B-1, 170B-2 can be substantially parallel to one another, as illustrated in FIG. 6, or can be transverse to one another. The passage axis PA can have a major component in the direction DX. The longitudinal axis LA of the pedestals 176-1, 176-2 and/or common pedestal 177 can be substantially parallel to each other, as illustrated in FIG. 6.

Facing walls 176W of the pedestals 176 and facing walls 177W of the pedestal 177 can be dimensioned such that the first and second branched sections 170B, 170B expand outwardly in the first direction D1 from the respective throats 178 and towards the outlet 174 to establish diffusion zones 180 along the respective branched sections 170B. A cross-sectional area at an exit of the diffusion zone 180 is greater than a cross-sectional area of the respective throat 178 such that the diffusion zone 180 serves to convey diffused cooling flow F from the branched sections 170B to the merged section 170M of the cooling passage 170.

Figure 7:
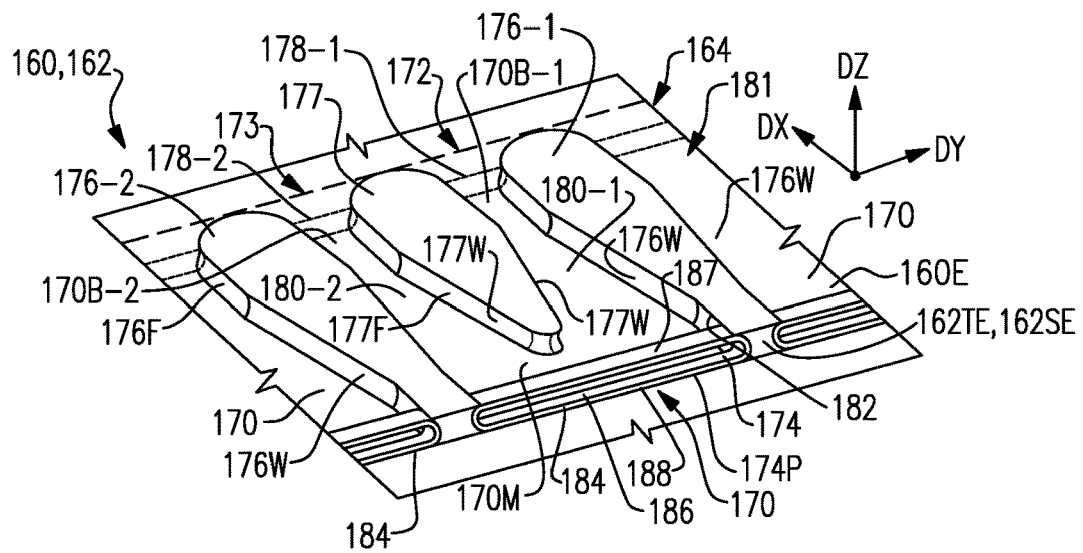
FIG. 7 illustrates a perspective view of a volume of the cooling arrangement of FIG. 5.
Figure 10:
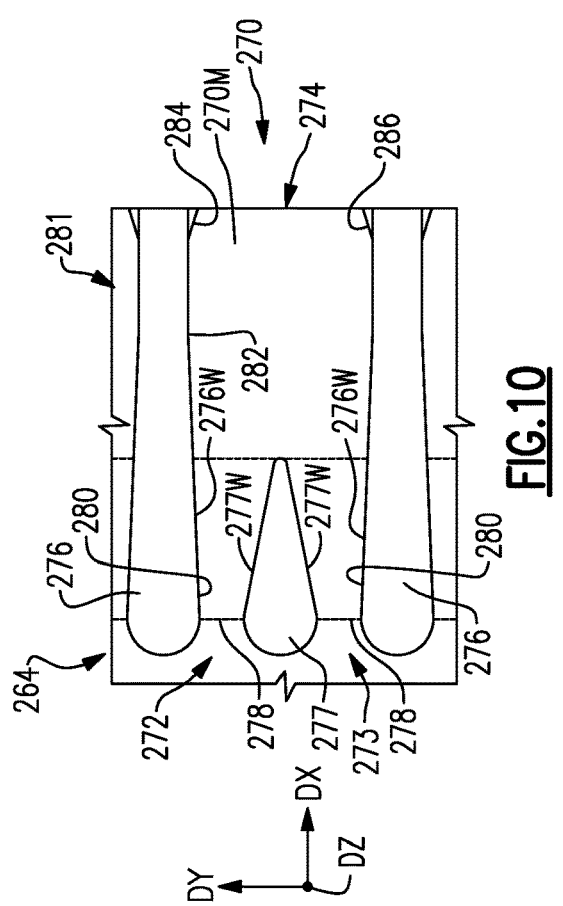
FIG. 10 illustrates another example cooling arrangement.
Figure 12:
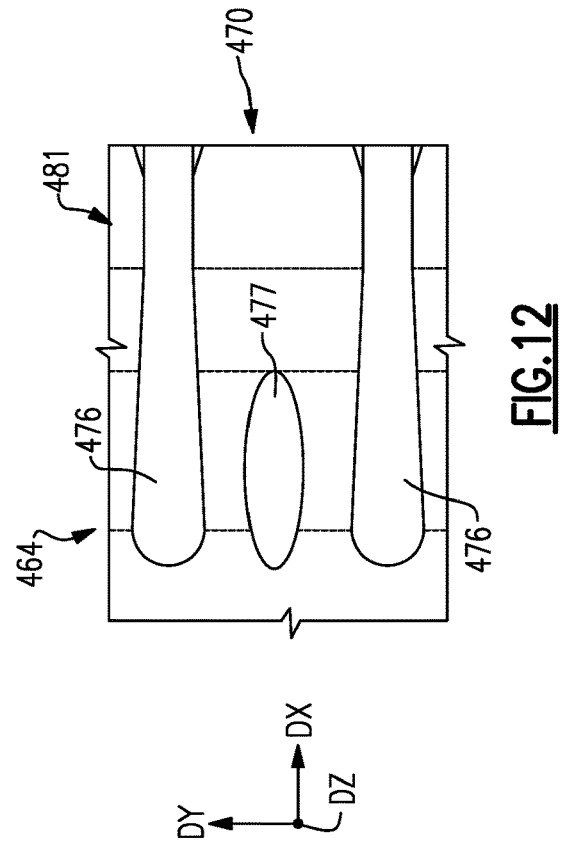
FIG. 12 illustrates another example cooling arrangement.

In the illustrative example of FIGS. 6-7, a first diffusion zone 180-1 is established along the first branched section 170B-1 between the first throat 178-1 and the merged section 170M, and a second diffusion zone 180-2 is established along the second branched section 170B-2 between the second throat 178-2 and the merged section 170M. The diffusion zones 180-1, 180-2 interconnect the respective throats 178-1, 178-2 to the merged section 170M and outlet 174. An entrance 180E to each diffusion zone 180 can be established a distance from the throat 178, as illustrated by FIG. 6, or can be established at the respective throat 178, as illustrated by the cooling arrangement 264 in FIG. 10. The diffusion zones 180 are dimensioned to convey diffused cooling flow F to the outlet 174. The outlet 174 can be dimensioned to eject or convey the diffused cooling flow F to various portions of the component 160 during operation, such as along the external wall surface 162SE of the component 160 to provide film cooling augmentation, for example.

The bounding pedestals 176 can have various geometries to establish a perimeter of the cooling passage 170. In the illustrative example of FIG. 6, facing walls 176W of the pedestals 176 are dimensioned to establish a converging pedestal arrangement 181 and a diverging cooling channel or passage 170 relative to a general direction of flow through the cooling arrangement 164. The width of the pedestals 176 generally decreases in the direction D1 to establish the converging pedestal arrangement 181 and diverging cooling passage 170. The facing walls 176W of the pedestals 176 establish a minimum width WA and a maximum width WB along a length of the cooling passage 170. The minimum width WA can be established at a position substantially aligned with the throats 178, and the maximum width WB can be established at a position substantially aligned with the outlet 174, as illustrated in FIG. 6. The maximum width WB is greater than the minimum width WA such that a distance between the facing walls 176W diverges in the first direction D1 from a position of the minimum width WA towards a position the maximum width WB.

A thickness of each pedestal 176, 177 can be dimensioned such that the pedestals 176, 177 taper along the longitudinal axis LA between the throat 178 and the outlet 174 to establish the diffusion zone 180. Each of the walls 176W can slope from the first length L1 to establish an angle α. Each of the walls 177W can slope from the first length L1 to establish an angle β. The angle α can be established with respect to a reference plane REFA extending along the first length L1 of the wall 176W. The angle β can be established with respect to a reference plane REFB extending along the first length L1 of the wall 177W.

The reference planes REFA and/or REFB can be substantially parallel to the passage axis PA and/or longitudinal axis LA of the respective pedestal 176, 177. Angle α and/or angle β can be greater than 0 degrees to establish the diffusion zones 180. In examples, the angles α, β are at least about 1 degree, or more narrowly are less than or equal to about 15 or 20 degrees. The angles α, β disclosed herein can be utilized to establish sufficient velocities of the cooling flow F which may more closely match a velocity of gases in the gas path GP (FIGS. 3-4). The diffusion zones 180 can be utilized to provide sufficient cooling and reduce a likelihood of metering due to blockage at the outlet 174.

The diffusion zone 180 extends along a third length L3. A width WC is established at the entrance 180E of the diffusion zone 180, and a width WD is established at an exit of the diffusion zone 180. In the illustrative example of FIG. 6, the width WD is greater than the width WC such that a distance or width between the bounding pedestals 176 progressively increases along the diffusion zones 180 in the first direction D1 towards the outlet 174.

The facing walls 176W of the bounding pedestals 176 can be substantially parallel along a length of the merged section 170M to establish a flat zone 182. A distance between the facing walls 176W of the bounding pedestals 176, excluding any coating thicknesses, can be approximately equal along a length of the flat zone 182 such that the cooling passage 170 has a substantially constant cross-sectional area along the length of the flat zone 182. The flat zone 182 is established between the diffusion zones 180 and outlet 174. The flat zone 182 may reduce variation in dimensioning of the outlets 174 that may be otherwise caused by shifting or movement of a casting core during formation of the cooling arrangement 164. In other examples, the flat zone 182 is omitted and the diffusion zone 180 establishes the outlet 174, as illustrated by the cooling arrangement 364 of FIG. 11.

Pedestals 176-1, 176-2 and common pedestal 177 can extend along respective reference planes REF1 to REF3 (FIGS. 6 and 8-9). The reference planes REF1 to REF3 are established along the respective longitudinal axes LA and bisect the respective pedestals 176-1, 176-2, 177, as illustrated by FIG. 6. The pedestals 176-1, 176-2, 177 can be substantially symmetrical along the respective reference planes REF1 to REF3, as illustrated by FIG. 6.

The bounding pedestals 176 can be dimensioned such that the facing walls 176W are substantially parallel along a first length L1 of the cooling passage 170 between the throats 178 and entrances 180E of the respective diffusion zones 180 to establish respective metering zones 179 (indicated at 179-1, 179-2) and are substantially parallel along a second length L2 of the cooling passage 170 between the diffusion zones 180 and outlet 174 to establish the flat zone 182, as illustrated in FIG. 6. In the illustrative example of FIGS. 7-9, no other pedestals are arranged between the facing walls 176W of the pedestals 176 and the facing walls 177W of the pedestal 177 bounding the respective branched sections 170B, including across the throat 178. Dimensioning the pedestals 176, 177 to have the metering zones 179 may provide more relatively consistent flow between two or more components 160. In examples, the first length L1 is between 0.5-3 hydraulic diameters. A "hydraulic diameter" can be calculated as 4 times the flow area divided by the wetted perimeter of the cooling passage.

The facing walls 176W, 177W of the pedestals 176, 177 can be partially or completely filleted. The facing walls 176W can be filleted along at least a portion of the cooling passage 170 between the respective first and second inlets 172, 173 and the outlet 174, including along the throats 178 and outlet 174, as illustrated in FIGS. 7-9. Fillets 176F, 177F of the respective pedestals 176, 177 establish junctions between the facing walls 176W, 177W and opposed faces 187, 188 bounding the cooling passage 170, as illustrated in FIGS. 8-9. The fillets 176F, 177F can be utilized to reduce localized stress concentrations in the component 160. The fillets 176F, 177F may improve filling of a respective core during formation of the cooling passages. Partial fillets may reduce weight as compared to full fillets. Full fillets may provide relatively lower stress concentrations with respect to partial fillets.

The component 160 can include one or more coatings 184 disposed or formed along various surfaces of the component 160. In the illustrative example of FIG. 6, one or more coatings 184 can be disposed along the external walls surface 162SE (184' shown in dashed lines for illustrative purposes). At least one coating 184 is disposed into and along one or more of the outlets 174 to establish a coated outlet region 186 of the merged section 170M of the respective cooling passage 170, as illustrated by FIGS. 6-7 and 9. In the illustrative example of FIGS. 7 and 9, the coating 184 is disposed along a perimeter 174P of the respective outlet 174, and along at least a portion of the length L2 of the flat zone 182. The coated outlet region 186 interconnects the outlet 174 and upstream portions of the cooling passage 170 including the diffusion zones 180. In the illustrative example of FIG. 6, the coating 184 is disposed along at least a portion of the second length L2 of the cooling passage 170 to establish the coated outlet region 186. The coating 184 can taper in the direction DX from the respective outlet 174 towards the respective inlet 172. The pedestals 176, 177 can be dimensioned such the throats 178 and diffusion zones 180 substantially or completely exclude any thermal barrier (or other) coatings.

A dimension of each of the throats 178-1, 178-2 can be selected with respect to a predetermined thickness of the coating 184, such as an expected maximum and/or average thickness of the coating 184 associated with the coated outlet region 186. Each of the throats 178-1, 178-2 can be dimensioned to establish a minimum cross-sectional area of the coated cooling passage 170 such that the throats 178-1, 178-2 meter cooling flow F through the cooling passage 170 in operation.

Various materials can be utilized for the coatings and transfer features disclosed herein, including metallic and non-metallic materials. Example metallic and non-metallic materials include any of the materials disclosed herein. The transfer features 175 including pedestals 176, 177 can be made of a first material, and each coating 184 can be made of a second material. The second material can be the same or can differ from the first material in composition and/or construction. In examples, the external walls 162E and each of the pedestals 176, 177 of the component 160 are made of a ceramic material such as a ceramic matrix composite (CMC) or can are made out of a metallic material such as a nickel based alloy. In examples, the coating(s) 184 are made of a ceramic material and/or metallic material. Each coating 184 can be established by one or more layers. Coating(s) 184 along the external surfaces 162SE can be ceramic coatings and serve as a thermal barrier coating to at least partially insulate the component 160 from relatively hot gases in the gaspath GP (FIGS. 3-4) in operation. Coating(s) 184 along the external surfaces 162SE can also be metallic coatings such as diffusion or overlay coatings that provide oxidation and/or corrosion resistance. These metallic coatings can also serve as a bond coating layer to facilitate the adhesion of the ceramic thermal barrier coating to the part substrate.

Referring to FIGS. 8-9, a local minimum cross-sectional area A1, A2 of the branched sections 170B-1, 170B2 of the cooling passage 170 are established along the respective throats 178-1, 178-2 (A1, A2 shown in dashed lines in FIG. 8 for illustrative purposes). A local minimum cross-sectional area A3 of the cooling passage 170 along the coated outlet region 186 can be established at the outlet 174 (A3 shown in dashed lines in FIG. 9 for illustrative purposes). The minimum cross-sectional area of the cooling passage A3 along the coated outlet region 186 divided by a total of the minimum cross-sectional areas A1, A2 of the first and second throats 178-1, 178-2 establishes a coated area ratio expressed as A3:(A1+A2). In examples, the coated area ratio is greater than or equal to about 0.8, or more narrowly is less than or equal to 1.5. In examples, the coated area ratio is less than or equal to about 1.25, such as about 1.0.

The cooling arrangement 164 can be dimensioned to establish a relatively compact arrangement that provide sufficient rigidity of the component 160 and sufficient cooling flow ejected from the outlet 174. For example, referring to FIG. 9, opposed faces 187, 188 of the wall 160E span or otherwise extend between the facing walls 176W of the adjacent pedestals 176 to bound the cooling passage 170. The opposed faces 187, 188 establish a first height H1 at the outlet 174. In examples, the coating 184 is relatively thick such that a ratio of an average thickness of the coating 184 along the opposed faces 187, 188 at the outlet 174 divided by the first height H1 is greater than or equal to about 0.08, or more narrowly less than or equal to about 0.35. The ratio can be greater than or equal to 0.12, and can be less than or equal to about 0.25. In other examples, the coating 184 is relatively thin such that the ratio is less than 0.08. The length L2 along the flat zone 182 can be greater than the first height H1 such that the throats 178 are established upstream of the coated outlet region 186.

A relationship between the throats 178 and the outlet 174 excluding the coatings 184 be established. A cross-sectional area A4 can be established between the facing walls 176W and opposed faces 187, 188 along the outlet 174 (A4 shown in dashed lines in FIG. 9 for illustrative purposes). The cross-sectional area A4 along the outlet 174 divided by an arithmetic additive total of the cross-sectional areas A1, A2 of the throats 178 establishes an uncoated area ratio expressed as A4:(A1+A2). In examples, the uncoated area ratio is greater than or equal to about 1.2, or more narrowly less than or equal to about 3.0, such as between about 1.4 and about 2.3, or about 2.0. In examples, the cooling arrangement 164 is established such that a ratio of A3:A4 is greater than about 0.2, or more narrowly is less than about 0.8.

The disclosed coated and uncoated area ratios can improve durability by establishing sufficient coating 184 thickness and cooling augmentation by the cooling passage 170, and can improve aerodynamics by establishing exit velocities of cooling flow F ejected by the outlet 174 to closely match velocities of gases in the gas path GP (FIGS. 3-4) to reduce losses that may be otherwise caused by mixing, turbulence, and flow separation, for example.

The pedestals 176 can be arranged relatively close which may increase structural rigidity along adjacent portions of the component 160. A cross-sectional area AP is established between the reference planes REF1, REF2 of the adjacent pedestals 176-1, 176-2 and opposed faces 187, 188 along an external wall surface 160SE of the component 160 at the outlet 174 (shown in dashed lines of FIG. 9 for illustrative purposes). The adjacent pedestals 176 and respective cooling passages 170 can be dimensioned such that one minus the cross-sectional area A3 of the outlet 174 bounded by the coated outlet region 186 of the respective cooling passage 170 divided by the cross-sectional area AP defines a blockage ratio (1−A3/AP). In examples, the blockage ratio (1−A3/AP) is greater than or equal to about 0.35, or more narrowly is less than or equal to about 0.7, such as about 0.6. One or more (or each) adjacent pair of pedestals and one or more (or each) cooling passage can be dimensioned according to any of the ratios and other parameters disclosed herein.

Other geometries of the transfer features can be utilized to establish the cooling passages. FIGS. 10-13 illustrate example converging pedestal arrangements 281, 381, 481, 581 and respective diverging cooling passages 270, 370, 470, 570. In the illustrative cooling arrangement 264 of FIG. 10, facing walls 276W, 277W of pedestals 276, 277 are dimensioned such that the metering zones are omitted. Entrances to diffusion zones 280 are established at respective throats 278.

Figure 11:
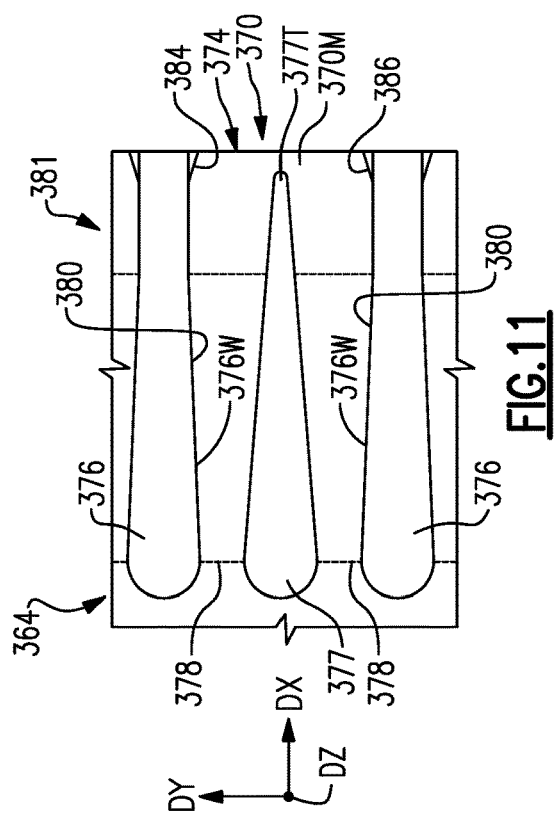
FIG. 11 illustrates another example cooling arrangement.
Figure 13:
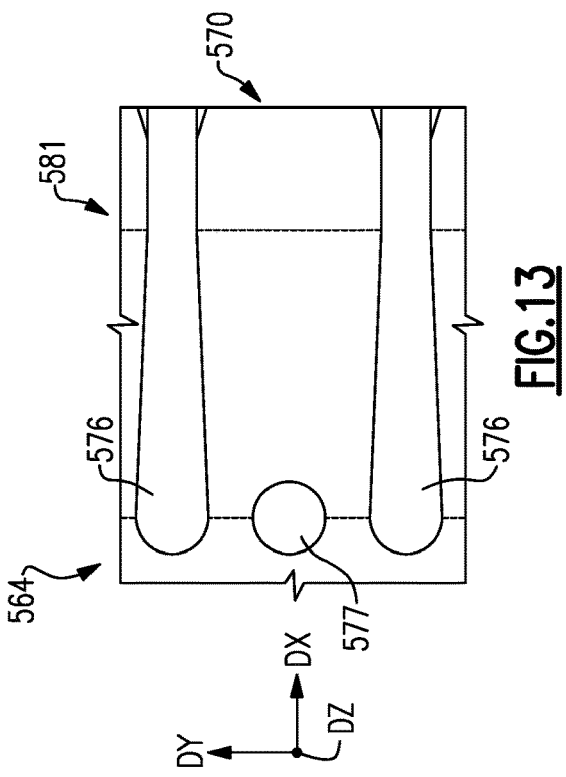
FIG. 13 illustrates another example cooling arrangement.

In the illustrative cooling arrangement 364 of FIG. 11, facing walls 376W of pedestals 376 are dimensioned such that the flat zone is omitted, and the facing walls 376W slope from the diffusion zones 380 to the outlet 374. Common pedestal 377 is dimensioned such that a terminal end 377T axially overlaps with a coated outlet region 386 of the cooling passage 370 with respect to direction DX. In the illustrative example of FIG. 12, common pedestal 477 has a substantially elliptical or oblong geometry. In the illustrative example of FIG. 13, common pedestal 577 has a substantially circular geometry.

Figure 14:
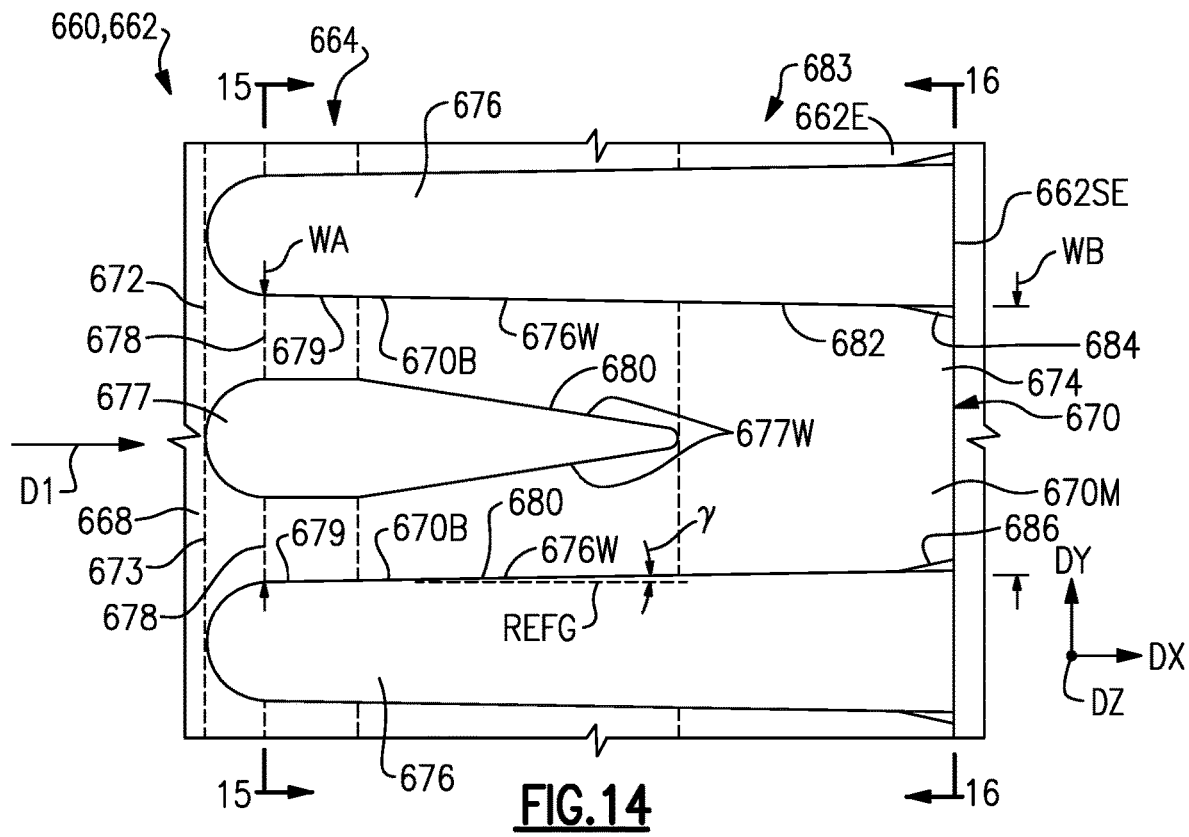
FIG. 14 illustrates a sectional view of a component including a cooling arrangement according to another example.
Figure 15:
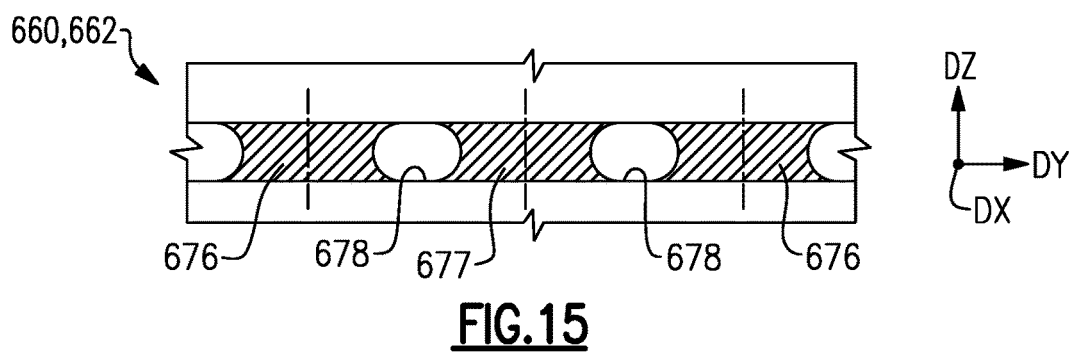
FIG. 15 illustrates a sectional view taken along line 15-15 of FIG. 14.
Figure 16:
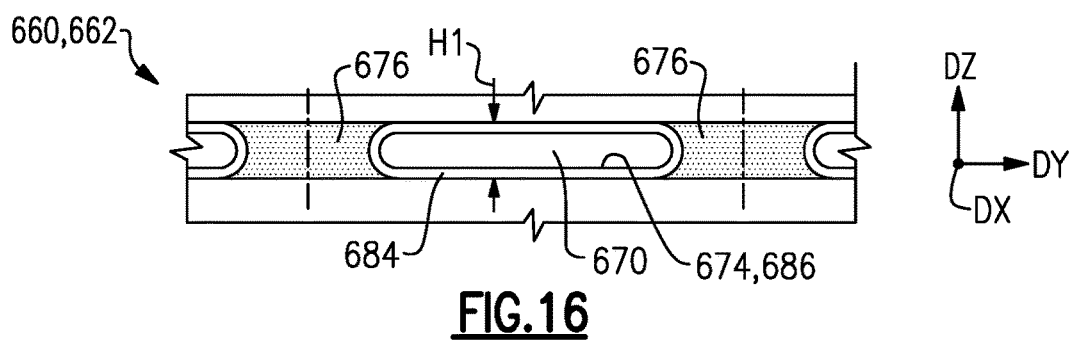
FIG. 16 illustrates a sectional view taken along line 16-16 of FIG. 14.

FIGS. 14-16 illustrate a gas turbine engine component 660 including a cooling arrangement 664 according to another example. In the illustrative example of FIG. 14, walls 676W of the pedestals 676 are dimensioned to establish a diverging pedestal arrangement 683 and converging cooling passage 670 arrangement. The width of the pedestals 676 generally increases in the direction D1 to establish the diverging pedestal arrangement 683, which may be utilized to more closely match a flow area at the throats 678 with a flow area at the outlet 674. The facing walls 676W of the pedestals 676 establish a minimum (e.g., upstream) width WA and a maximum (e.g., outlet) width WB. The minimum width WA can be established at a position substantially aligned with the throats 678, and the width WB is established at a position substantially aligned with an outlet 674 such that the position associated with the minimum width WA is upstream of the position associated with the width WB, as illustrated in FIG. 14. The width WB is less than the minimum width WA such that a distance between the facing walls 676W converges in the first direction D1 from the minimum width WA position towards the maximum width WB position. The pedestals 676 can be dimensioned such that a distance between uncoated portions of the walls 676W of the respective pedestal 676 progressively increases along diffusion zones 680 in a first direction D1 towards an outlet 674, as illustrated by FIG. 14.

Each of the walls 676W can slope from a respective metering zone 679 to establish an angle γ. The angle γ can be established with respect to a reference plane REFG extending along a length of the wall 676W establishing the metering zone 679. The angle γ can be greater than 0 degrees to establish the diffusion sections 680. In examples, the angle γ is least about 1 degree, or more narrowly is less than or equal to about 15 or 20 degrees. The angles γ disclosed herein can be utilized to establish sufficient velocities of the cooling flow F which may more closely match a velocity of gases in the gas path GP (FIGS. 3-4).

One or more coatings 684 are disposed along and into the outlet 674 to establish a coated outlet region 686. Opposed faces 687, 688 establish a first height H1 at the outlet 674 (FIG. 16). A ratio of an average thickness of the coating 684 along the opposed faces 687, 688 at the outlet 674 divided by the first height H1 can be established. The ratio can include any of the values disclosed herein. In examples, the ratio is greater than 0.08, and is less than 0.35.

Figure 17:
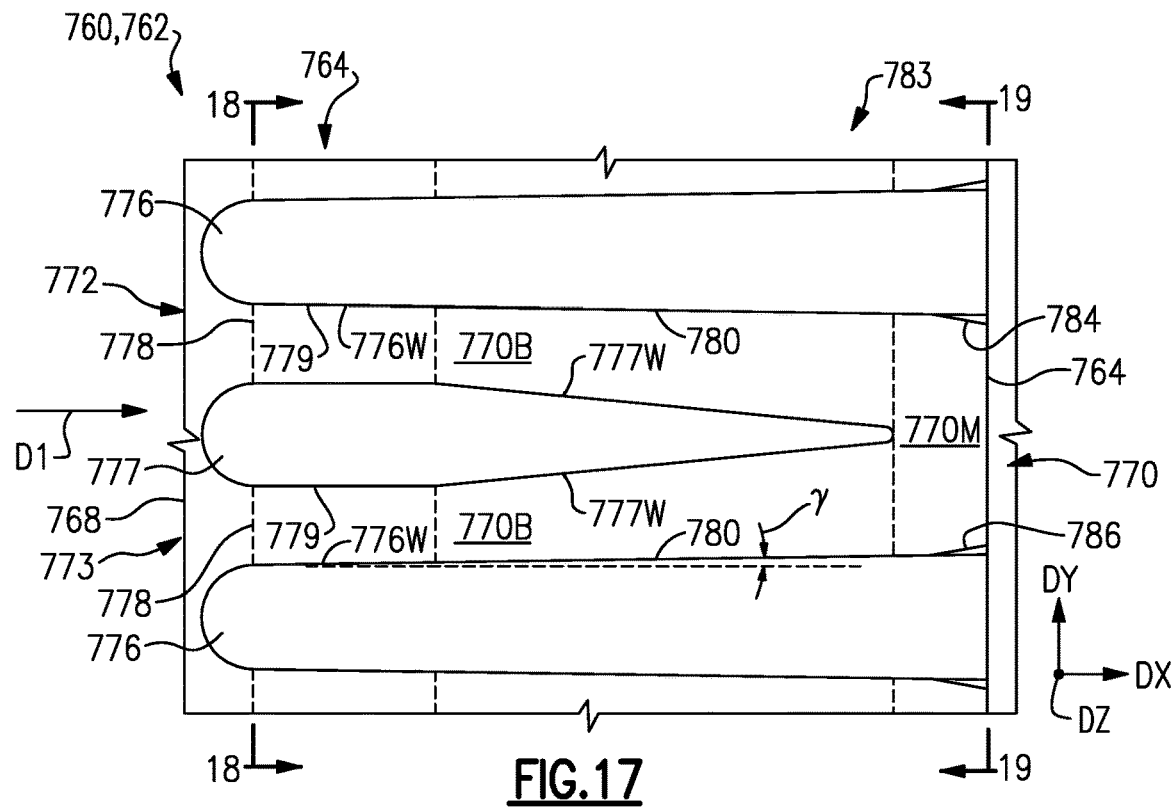
FIG. 17 illustrates a sectional view of a component including a cooling arrangement according to another example.
Figure 18:
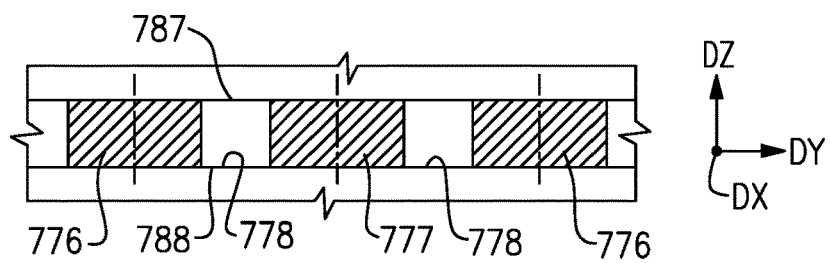
FIG. 18 illustrates a sectional view taken along line 18-18 of FIG. 17.
Figure 19:
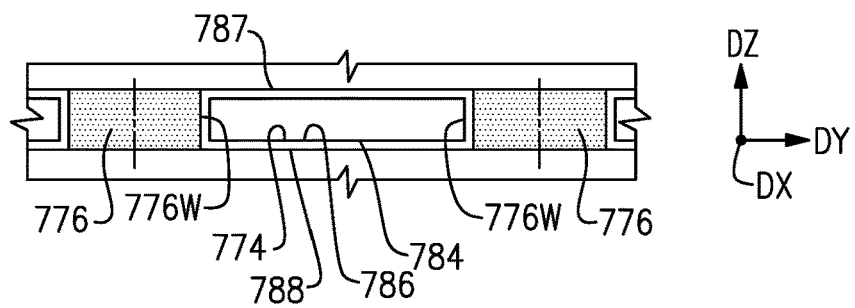
FIG. 19 illustrates a sectional view taken along line 19-19 of FIG. 17.

FIGS. 17-19 illustrate a gas turbine engine component 760 including a cooling arrangement 764 according to another example. Walls 776W of pedestals 776 and walls 777W of pedestal 777 are dimensioned to establish both a diverging and converging combined pedestal arrangement 783. The pedestals 776 are dimensioned such that a distance between uncoated portions of the adjacent pedestals 776 progressively decreases along diffusion zones 780 in a first direction D1 towards an outlet 774. Each of the walls 776W can slope from a respective metering zone 779 to establish an angle γ, which may be dimensioned according to any of the values disclosed herein. In the illustrative cooling arrangement 764 of FIG. 17, the facing walls 776W of the pedestals 776 are dimensioned such that the flat zone is omitted, and the facing walls 776W continue to slope from the diffusion zones 780 to the outlet 774. In the illustrative example of FIGS. 18 and 19, the throats 778 and outlet 774 have a substantially rectangular geometry.

Figure 20:
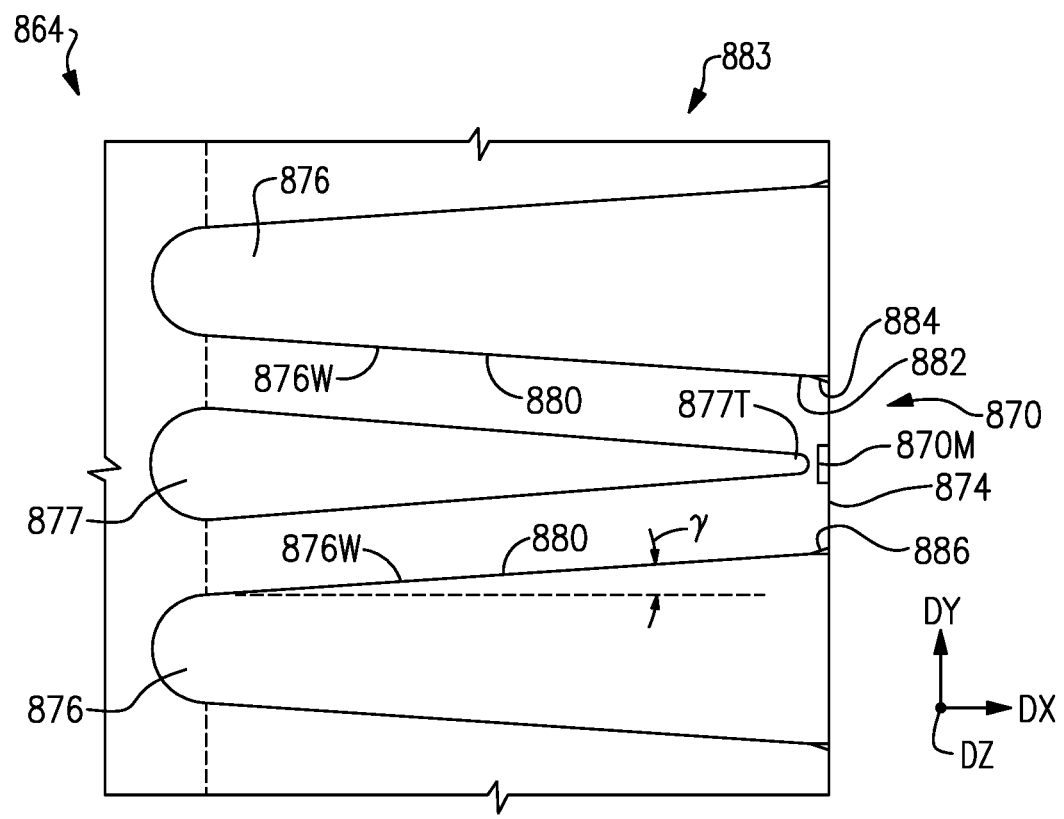
FIG. 20 illustrates another example cooling arrangement.

FIG. 20 illustrates another example cooling arrangement 864 established by a converging and diverging pedestal arrangement 883. Facing walls 876W of pedestals 876 are dimensioned to establish a flat zone 882 extending to an outlet 874. Common pedestal 877 is dimensioned such that a terminal end 877T axially overlaps with a coated outlet region 886 of the cooling passage 870 with respect to direction DX.

Figure 21:
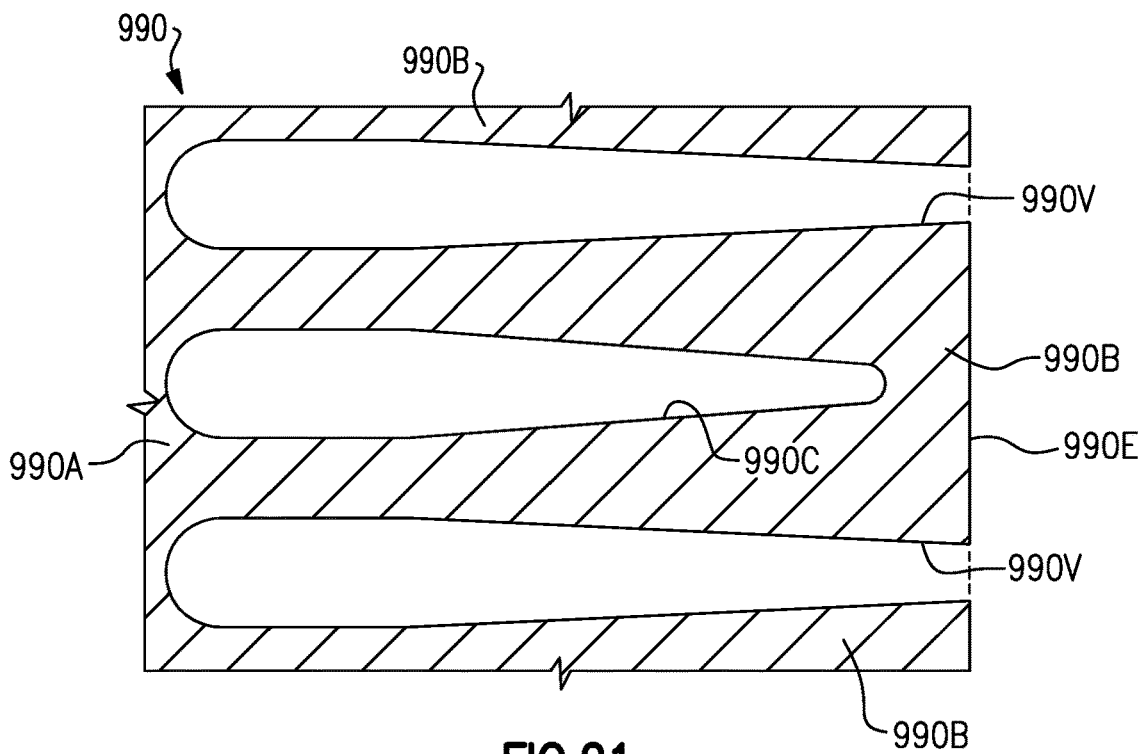
FIG. 21 illustrates an example casting core.
Figure 22:
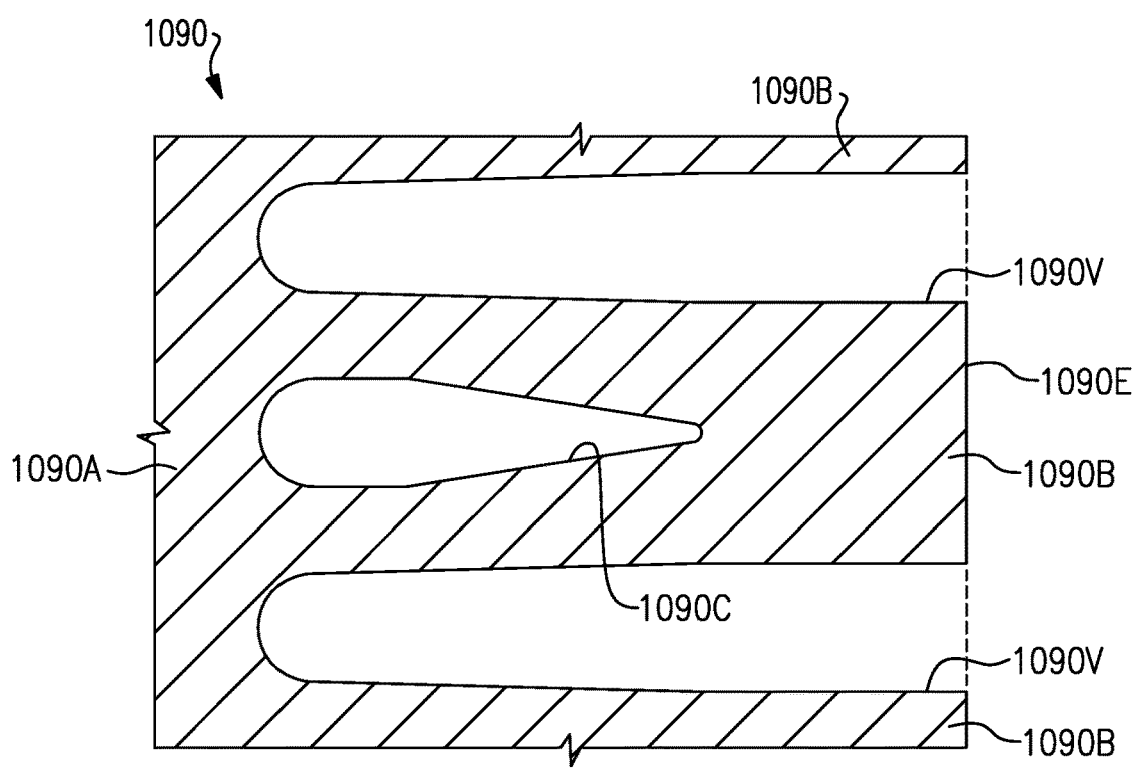
FIG. 22 illustrates another example casting core.

FIGS. 21-22 illustrate exemplary casting cores 990, 1090 that can be utilized for establishing a cooling arrangement, including any of the cooling arrangements disclosed herein. Core 990/1090 can include a main body 990A/1090A and one or more branches 990B/1090B that extend outwardly from the main body 990A/1090A to a respective free end 990E/1090E. Adjacent branches 990B/1090B can establish a respective void 990V/990V therebetween. The branches 990B/1090B can establish a respective cavity 990C/1090C. A geometry of the voids 990V/1090V and cavities 990C/1090C can correspond to a geometry of any of the transfer features or pedestals disclosed herein, and a geometry of the branches 990B/1090B can correspond to any of the cooling passages disclosed herein. The free ends 990E/1090E can correspond a geometry of any of the outlets disclosed herein, including outlets along a trailing edge of a corresponding airfoil. Various materials can be utilized to form the cores 990, 1090, such as a refractory metal core (RMC) or ceramic core.

Figure 23:
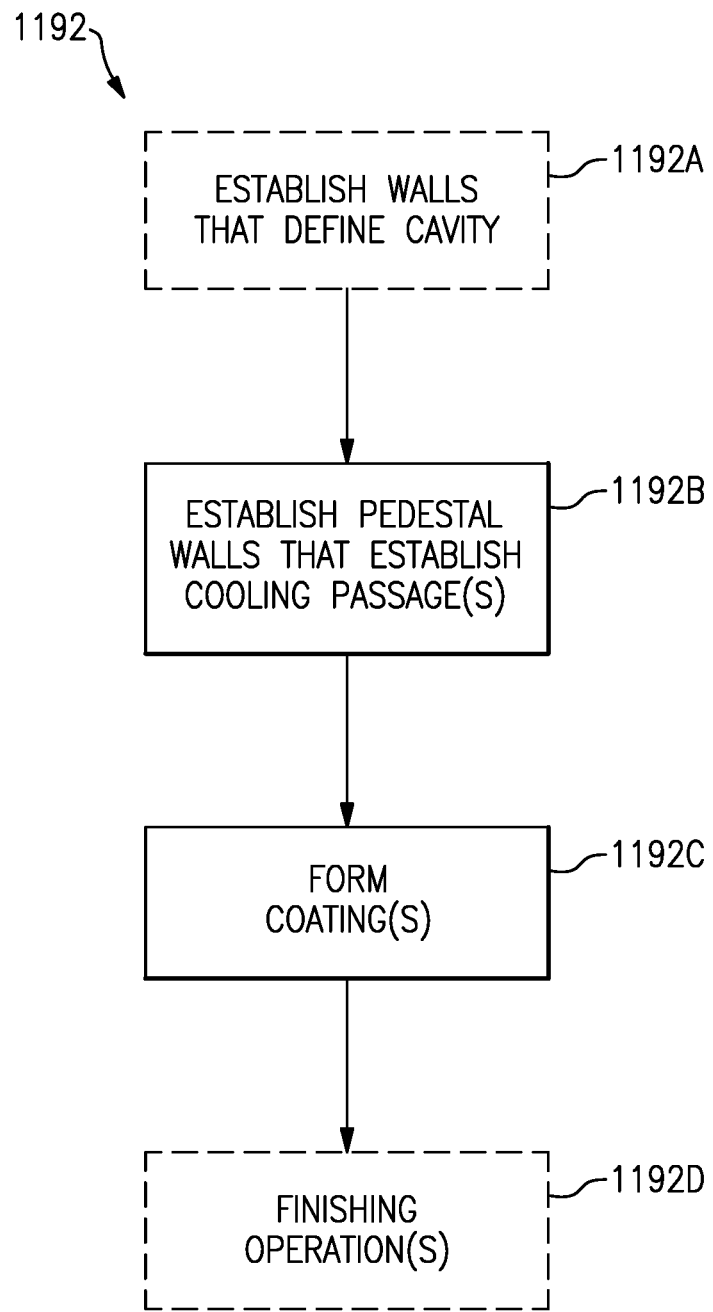
FIG. 23 illustrates an exemplary process for forming a component.

FIG. 23 illustrates an exemplary process in a flowchart 1192 for fabricating a gas turbine engine component including any of the components disclosed herein. The component 160, 660 are referenced for illustrative purposes. However, it should be appreciated that the process 1192 can be utilized in combination with any of the cooling arrangements disclosed herein. Although only four steps 1192A-1192D are shown, it should be understand that fewer or more than four steps can be utilized, and each step 1192A-1192D may encompass more than one step.

With reference to FIGS. 6 and 14, one or more walls that define the internal cavities 168/668 can be established at step 1192A, including outer walls such as the external walls 162E/662E of the component 160/660. In other examples, step 1192A is omitted. In some examples, steps 1192A and 1192B occur simultaneously. The internal cavities 168/668 can be bounded by an external wall 162E/662E of the component 160/660.

At step 1192B, one or more walls 176W/676W, 177W/677W of the pedestals 176/676 that define the cooling passages 170/670 of a cooling arrangement 164/664 are established. The walls 176W/676W, 177W/677W of the pedestals 176/676 and associated cooling passages 170/670 can be established in an outer wall of the component 160/660, such as the external wall 162E/662E of the component 160/660. Each cooling passage 170/670 includes a pair of inlets 172/672, 173/673 coupled to the internal cavity 168/668, which can serve as an upstream feed cavity that conveys cooling flow to each cooling passage 170/670 in operation. The adjacent pedestals 176/676 can extend from the external wall surface 162SE/662SE of the external wall 162E/662E to establish an outlet 174/674 of the cooling passage 170/670. A common pedestal 177/677 is situated between the adjacent pedestals 176/676 to establish a first branched section 170B-1/670B-1 and a second branched section 170B-2/670B-2 that join together at a merged section 170M/670M of the cooling passage 170/670.

The adjacent pedestals 176/676 can be dimension such that the cooling passage 170/670 tapers inwardly from the inlet 172/672, 173/673 in a first direction (e.g., direction DX) towards the outlet 174/674 to establish respective throats 178/278 of the branched sections 170B-1/670B-1, 170B-2/670B-2. The pedestals 176/676 can be dimensioned such that the branched sections 170B/670B of the cooling passage 170/670 expand outwardly from the respective throats 178/678 in the first direction D1 towards the outlet 174/674 to establish respective diffusion zones 180-1/680-1, 180-2/680-2 interconnecting the throats 178-1/678-1, 178-2/678-2 and the outlet 174/674. A casting core can be utilized in steps 1192A and 1192B to establish the cooling arrangement, such as the cores 990, 1090 of FIGS. 21-22.

At step 1192C, one or more coatings 184/684, 184'/684' can be formed along a surface of the wall of the component 160/660 and into the outlet 174/674 to establish a coated outlet region 186/686 of the respective cooling passage 170/670, as illustrated by the cooling arrangement 264/664 of FIGS. 6 and 14. The disclosed cooling arrangements can be utilized to reduce a likelihood of metering at the coated outlet region 186/686 due to partial blockage. One or more finishing operations can be performed at step 1192D. Exemplary finishing operations can include machining or treating surfaces of the component, for example. Some intermittent finishing operations may also be performed between steps 1192A and 1192B, while others may be executed after step 1192B and before step 1192C.

The disclosed cooling arrangements can be utilized to provide sufficient structural support in combination with sufficient film cooling coverage to counteract high heat loads in the component during operation. The disclosed cooling arrangements can provide relatively higher film effectiveness and reduced mixing loses that may be otherwise caused by gaspath velocities being much higher than cooling flow ejected by the outlets, and can reduce variability in cooling augmentation between the adjacent cooling passages that may otherwise be caused due to variation in coating thickness. Flow separation can be reduced, including for rotating airfoils or blades which may have radial variability due to centrifugal forces caused by rotation. The throat dimensioning can be set to relatively tight tolerances which can reduce variability in cooling augmentation across the airfoils in a respective array or row, which can improve efficiency of the engine. The disclosed cooling arrangements can be utilized to provide lower material temperatures, lower thru-thickness gradients, lower transient thermal gradients, and improved durability, and may be produced at a relatively lower cost.

The disclosed cooling arrangements can be utilized to provide sufficient structural support in combination with sufficient film cooling coverage to counteract high heat loads in the component during operation. The disclosed cooling arrangements can provide relatively lower mixing losses, higher film effectiveness, lower material temperatures, lower thru-thickness gradients, lower transient thermal gradients, and improved durability, and may be produced at a relatively lower cost.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine component comprising:
    an external wall including adjacent bounding pedestals that extend from an external wall surface to establish a cooling passage, and including a common pedestal situated between the adjacent bounding pedestals to establish a first branched section and a second branched section of the cooling passage that join together at a merged section of the cooling passage, first and second inlets established between the common pedestal and respective ones of the adjacent bounding pedestals, the first and second inlets coupled to an internal cavity, the merged section interconnecting the first and second branched sections and an outlet, the outlet established along the external wall surface between the adjacent bounding pedestals which extend to the outlet, and the common pedestal spaced apart from the outlet;
    wherein the adjacent bounding pedestals and the common pedestal are dimensioned such that first and second throats are established along the respective first and second branched sections and such that the first and second branched sections expand towards the outlet to establish respective diffusion zones, the diffusion zones interconnecting the merged section and the respective first and second throats;
    one or more coatings extending into the outlet to establish a coated outlet region of the cooling passage; and
    wherein the first and second throats establish a local minimum cross-sectional area along the respective first and second branched sections, a local minimum cross-sectional area of the cooling passage along the coated outlet region divided by a total of the minimum cross-sectional areas of the first and second throats establishes a coated area ratio, and the coated area ratio is greater than or equal to 0.8, and is less than or equal to 1.5.

2. The gas turbine engine component as recited in claim 1, wherein each of the adjacent bounding pedestals and the common pedestal comprises a ceramic or metallic material, and the one or more coatings comprise a ceramic and/or metallic material.

3. The gas turbine engine component as recited in claim 1, wherein the gas turbine engine component is an airfoil including an airfoil section extending in a radial direction from a platform section, extending in a chordwise direction between a leading edge and a trailing edge, and extending in a thickness direction between a pressure side and a suction side that join together at the leading and trailing edges.

4. The gas turbine engine component as recited in claim 3, wherein:
    the outlet is established along the trailing edge;
    each of the adjacent bounding pedestals and the common pedestal comprises a metallic or ceramic material, and the one or more coatings includes a thermal barrier coating comprising a ceramic material and/or metallic material;
    the coated area ratio is less than or equal to 1.5; and
    the first and second branched sections exclude any pedestals between the common pedestal and the respective adjacent bounding pedestals.

5. The gas turbine engine component as recited in claim 1, wherein a distance between the uncoated adjacent bounding pedestals progressively increases along the diffusion zones in a first direction towards the outlet.

6. The gas turbine engine component as recited in claim 1, wherein a distance between the uncoated adjacent bounding pedestals progressively decreases along the diffusion zones in a first direction towards the outlet.

7. The gas turbine engine component as recited in claim 1, wherein the adjacent bounding pedestals include first and second pedestals extending along respective longitudinal axes that are substantially parallel to each other, the first pedestal is associated with the first branched section, the second pedestal is associated with the second branched section, facing walls of the common pedestal and the first pedestal are substantially parallel along a first length of the cooling passage between the first throat and the respective diffusion zone to establish a first metering zone, facing walls of the common pedestal and the second pedestal are substantially parallel along the first length of the cooling passage between the second throat and the respective diffusion zone to establish a second metering zone, and facing walls of the adjacent bounding pedestals are substantially parallel along a second length of the merged section to establish a flat zone.

8. The gas turbine engine component as recited in claim 7, wherein the longitudinal axes of the adjacent bounding pedestals establish a pitch, a first width is established as a widest distance across the first throat, a second width is established as a widest distance across the second throat, and wherein a ratio of a total of the first and second widths divided by the pitch is greater than or equal to 0.25 and is less than or equal to 0.65.

9. The gas turbine engine component as recited in claim 7, wherein the cooling passage excludes any pedestals across the first and second throats.

10. The gas turbine engine component as recited in claim 1, wherein:
    opposed faces of the external wall span between the facing walls of the adjacent bounding pedestals to bound the cooling passage, and the opposed faces establish a first height at the outlet; and a ratio of an average thickness of the one or more coatings along the opposed faces at the outlet divided by the first height is greater than or equal to 0.08.

11. The gas turbine engine component as recited in claim 10, wherein:
the adjacent bounding pedestals extend along respective longitudinal axes and along respective reference planes that bisects the adjacent bounding pedestals along the respective longitudinal axes, and the longitudinal axes are substantially parallel to each other;
a first cross-sectional area is established along the external wall surface at the outlet, and the first cross-sectional area is defined between the reference planes and between the opposed faces; and
one minus a ratio of a cross-sectional area of the outlet bounded by the coated outlet region divided by the first cross-sectional area defines a blockage ratio, and the blockage ratio is greater than or equal to 0.35.

12. The gas turbine engine component as recited in claim 10, wherein the facing walls of the adjacent bounding pedestals bounding the cooling passage are filleted from the respective first and second inlets to the outlet.

13. A gas turbine engine comprising:
an array of blades and an array of vanes spaced axially from the array of blades in a gas path, the array of blades are rotatable in the gas path, and an array of blade outer air seals (BOAS) arranged about the array of blades to bound the gas path; and
wherein at least one of the array of blades, the array of vanes and the array of BOAS comprises:
an external wall between an internal wall surface and an external wall surface, the internal wall surface bounding an internal cavity;
wherein at least one pair of adjacent bounding pedestals are established in a thickness of the external wall, the adjacent bounding pedestals extend from the external wall surface to establish a cooling passage, a common pedestal is situated between the adjacent bounding pedestals to establish a first branched section and a second branched section that join together at a merged section, the merged section establishes an outlet along the external wall surface between the adjacent bounding pedestals which extend to the outlet, the common pedestal is spaced apart from the outlet, and the adjacent bounding pedestals and the common pedestal establish first and second throats along the respective first and second branched sections and establish respective diffusion zones between the respective first and second throats and the merged section;
one or more coatings extending into the outlet to establish a coated outlet region of the merged section of the cooling passage; and
wherein the first and second throats establish a local minimum cross-sectional area along the respective first and second branched sections, a local minimum cross-sectional area of the cooling passage along the coated outlet region divided by a total of the local minimum cross-sectional areas of the first and second throats establishes a coated area ratio, and the coated area ratio is greater than or equal to 0.8, and is less than or equal to 1.5.

14. The gas turbine engine as recited in claim 13, wherein:
an airfoil section comprises the external wall, the airfoil section extends in a thickness direction between pressure and suction sides and extends in a chordwise direction between leading and trailing edges, and the outlet is established adjacent the trailing edge; and
the external wall comprises a ceramic or metallic material, and the one or more coatings includes a thermal barrier coating comprising a ceramic material and/or a metallic material.

15. The gas turbine engine as recited in claim 14, wherein:
first and second inlets to the respective first and second branched sections are established between the adjacent bounding pedestals and the common pedestal, and the first and second inlets are coupled to the internal cavity;
the first and second branched sections taper from the respective first and second inlets in a first direction towards the outlet to establish the first and second throats; and
a distance between the adjacent bounding pedestals progressively increases along the diffusion zones in the first direction towards the outlet.

16. The gas turbine engine as recited in claim 14, wherein:
first and second inlets to the respective first and second branched sections are established between the adjacent bounding pedestals and the common pedestal, the first and second inlets are coupled to the internal cavity;
the first and second branched sections taper from the respective first and second inlets in a first direction towards the outlet to establish the first and second throats; and
a distance between the adjacent bounding pedestals progressively decreases along the diffusion zones in the first direction towards the outlet.

17. A method of fabricating a gas turbine engine component comprising:
establishing an internal cavity bounded by an external wall;
establishing a cooling passage between adjacent bounding pedestals in the external wall, wherein the adjacent bounding pedestals extend from an external wall surface of the external wall to establish an outlet of the cooling passage, a common pedestal is situated between the adjacent bounding pedestals to establish a first branched section and a second branched section of the cooling passage that join together at a merged section of the cooling passage, the merged section interconnects the first and second branched sections and the outlet, and the common pedestal is spaced apart from the outlet, first and second inlets to the respective first and second branched sections are established between the adjacent bounding pedestals and the common pedestal, and the first and second inlets are coupled to the internal cavity;
wherein the adjacent bounding pedestals and the common pedestal are dimensioned such that first and second throats are established along the respective first and second branched sections and such that the first and second branched sections expand towards the outlet to establish respective diffusion zones, the diffusion zones interconnecting the merged section and the respective first and second throats;
forming one or more coatings along the external wall surface and into the outlet to establish a coated outlet region of the cooling passage; and
wherein the first and second throats establish a local minimum cross-sectional area along the respective first and second branched sections, a local minimum cross-sectional area of the cooling passage along the coated outlet region divided by a total of the local minimum cross-sectional areas of the first and second throats establishes a coated area ratio, and the coated area ratio is greater than or equal to 0.8, and is less than or equal to 1.5.

18. The method as recited in claim 17, wherein:

the gas turbine engine component is an airfoil including an airfoil section extending in a radial direction from a platform section, extending in a chordwise direction between a leading edge and a trailing edge, and extending in a thickness direction between a pressure side and a suction side that join together at the leading and trailing edges;

the outlet is established along the trailing edge; and each of the adjacent bounding pedestals and the common pedestal comprises a metal or ceramic material, and the one or more coatings comprise a ceramic and/or metallic material.

19. The method as recited in claim 17, wherein:

the first and second branched sections taper from the respective first and second inlets in a first direction towards the outlet to establish the first and second throats; and a distance between the adjacent bounding pedestals progressively increases along the diffusion zones in the first direction towards the outlet.

20. The method as recited in claim 17, wherein:

the first and second branched sections taper from the respective first and second inlets in a first direction towards the outlet to establish the first and second throats; and a distance between the adjacent bounding pedestals progressively decreases along the diffusion zones in the first direction towards the outlet.

* * * * *